United States Patent
Hong et al.

(10) Patent No.: US 10,782,195 B2
(45) Date of Patent: Sep. 22, 2020

(54) FORCE SENSOR

(71) Applicant: SAMSUNG DISPLAY CO., LTD., Yongin-si, Gyeonggi-do (KR)

(72) Inventors: Won Ki Hong, Suwon-si (KR); Sung Kook Park, Suwon-si (KR); Tae Hee Lee, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/143,825

(22) Filed: Sep. 27, 2018

(65) Prior Publication Data
US 2019/0310143 A1 Oct. 10, 2019

(30) Foreign Application Priority Data
Apr. 5, 2018 (KR) .......................... 10-2018-0039899

(51) Int. Cl.
*G01L 1/20* (2006.01)
*G06F 3/041* (2006.01)
*G01L 5/161* (2020.01)

(52) U.S. Cl.
CPC ................ *G01L 1/20* (2013.01); *G01L 5/161* (2013.01); *G06F 3/0414* (2013.01)

(58) Field of Classification Search
CPC .......... G01L 1/20; G01L 5/161; G06F 3/0414
USPC ....................................................... 73/862.68
See application file for complete search history.

(56) References Cited

U.S. PATENT DOCUMENTS

| 8,199,116 | B2* | 6/2012 | Jeon ...................... G06F 3/0412 345/173 |
| 8,654,524 | B2 | 2/2014 | Pance et al. |
| 9,274,660 | B2 | 3/2016 | Bernstein et al. |
| 2013/0076687 | A1* | 3/2013 | Giddings .............. G06F 3/0412 345/174 |
| 2014/0028575 | A1 | 1/2014 | Parivar et al. |
| 2014/0267134 | A1 | 9/2014 | Bulea et al. |
| 2016/0287089 | A1 | 10/2016 | Yi et al. |
| 2017/0276696 | A1* | 9/2017 | Yoshida .............. G01P 15/0802 |
| 2017/0357344 | A1* | 12/2017 | Hong .................... G06F 3/0414 |

FOREIGN PATENT DOCUMENTS

| EP | 2 333 645 | 6/2011 |
| KR | 10-2016-0118915 | 10/2016 |
| KR | 10-2016-0129470 | 11/2016 |

OTHER PUBLICATIONS

Extended European Search Report issued in corresponding European Appln No. 18210027.1 dated Jun. 26, 2019.

\* cited by examiner

*Primary Examiner* — Max H Noori
(74) *Attorney, Agent, or Firm* — F. Chau & Associates, LLC

(57) ABSTRACT

A force sensor including a first surface and a second surface facing each other in a first direction; a first protrusion protruded from the first surface toward the second surface; a first electrode on the first protrusion; a first force sensing layer on the first electrode; a second protrusion protruded from the second surface toward the first surface; and a second electrode on the second protrusion, wherein the first protrusion and the second protrusion are not overlapped with each other or are partially overlapped with each other.

30 Claims, 29 Drawing Sheets

FIG. 23
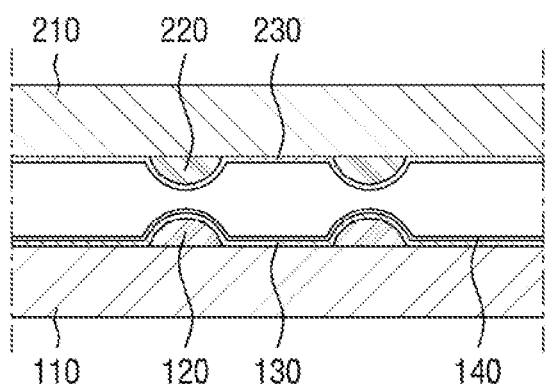
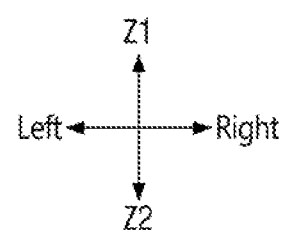

FIG. 29
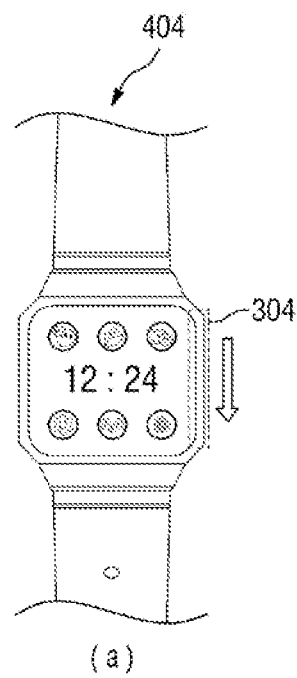
(a)
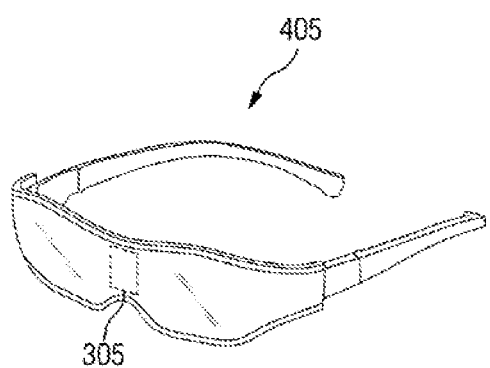
(b)
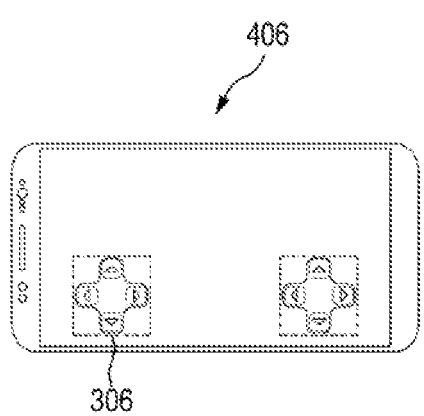
(c)
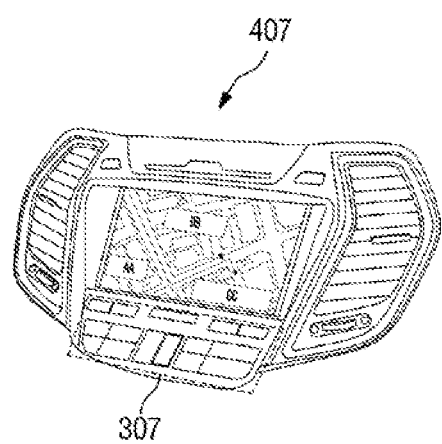
(d)

FORCE SENSOR

CROSS-REFERENCE TO RELATED APPLICATION

This application claims priority under 35 U.S.C. § 119 to Korean Patent Application No. 10-2018-0039899, filed on Apr. 5, 2018 in the Korean Intellectual Property Office, the disclosure of which is incorporated by reference herein in its entirety.

1. TECHNICAL FIELD

The present invention relates to a force sensor, and more particularly, to a force sensor for sensing a shear force.

2. DESCRIPTION OF THE RELATED ART

Electronic devices that provide images to a user such as a smart phone, a tablet personal computer (PC), a digital camera, a laptop computer, a navigation device and a smart television include a display device for displaying images. Such a display device includes a display panel for generating and displaying an image and various input devices.

A touch panel that recognizes a touch input is widely employed as a display device of a smartphone or a tablet PC. Due to its convenience, a touch panel is increasingly used as a replacement for existing physical input devices such as a keypad.

A force sensor may be used on a display device employing a touch panel. Typically, a force sensor detects a force applied in the thickness direction of the display device. Although user interfaces (UIs) may only be implemented with inputs in the thickness direction of the display panel, to realize a more diverse and realistic UI, it may be useful to recognize forces applied in various directions as separate inputs.

SUMMARY

According to an exemplary embodiment of the present invention, there is provided a force sensor. The force sensor comprises: a first surface and a second surface facing each other in a first direction; a first protrusion protruded from the first surface toward the second surface; a first electrode on the first protrusion; a first force sensing layer on the first electrode; a second protrusion protruded from the second surface toward the first surface; and a second electrode on the second protrusion, wherein the first protrusion and the second protrusion are not overlapped with each other or are partially overlapped with each other.

According to another exemplary embodiment of the present invention, there is provided a force sensor. The force sensor comprises: a first sensor element comprising a first substrate, a first protrusion disposed on the first substrate, a first electrode on the first protrusion, and a first force sensing layer on the first electrode; and a second sensor element comprising a second substrate, a second protrusion disposed on the second substrate, and a second electrode disposed on the second protrusion, wherein the force sensing layer faces the second electrode, and wherein the first protrusion and the second protrusion do not overlap with each other, or at least partially overlap with each other.

According to another exemplary embodiment of the present invention, there is provided a force sensor. The force sensor comprises: a plurality of sensing cells; a plurality of first electrodes extended in a first extending direction; and a plurality of second electrodes extended in a second extending direction and intersecting with the first electrodes; wherein at least one of the sensing cells includes a plurality of sub-sensing regions located at intersections between the first electrodes and the second electrodes, wherein at least one of the sub-sensing regions comprises: a first surface and a second surface facing each other in a thickness direction of the force sensor, a plurality of protrusions protruded from the first surface toward the second surface, one of the first electrodes on the plurality of first protrusions, and a first force sensing layer on the one first electrode, a plurality of second protrusions protruded from the second surface toward the first surface, and one of the second electrodes on the plurality of second protrusions, wherein an adjacent first protrusion and second protrusion form a pair of protrusions, and wherein the first protrusion and the second protrusion in the pair do not overlap with each other, or at least partially overlap with each other.

BRIEF DESCRIPTION OF THE DRAWINGS

The above and other features of the present invention will become more apparent by describing in detail exemplary embodiments thereof with reference to the attached drawings, in which:

FIG. 23 is a cross-sectional view taken along line XXIII-XXIII' of FIG. 22, according to an exemplary embodiment of the present invention;

FIGS. 28 and 29 are views of electronic devices including pressure sensors according to exemplary embodiments of the present invention.

DETAILED DESCRIPTION OF THE EMBODIMENTS

Figure 1:
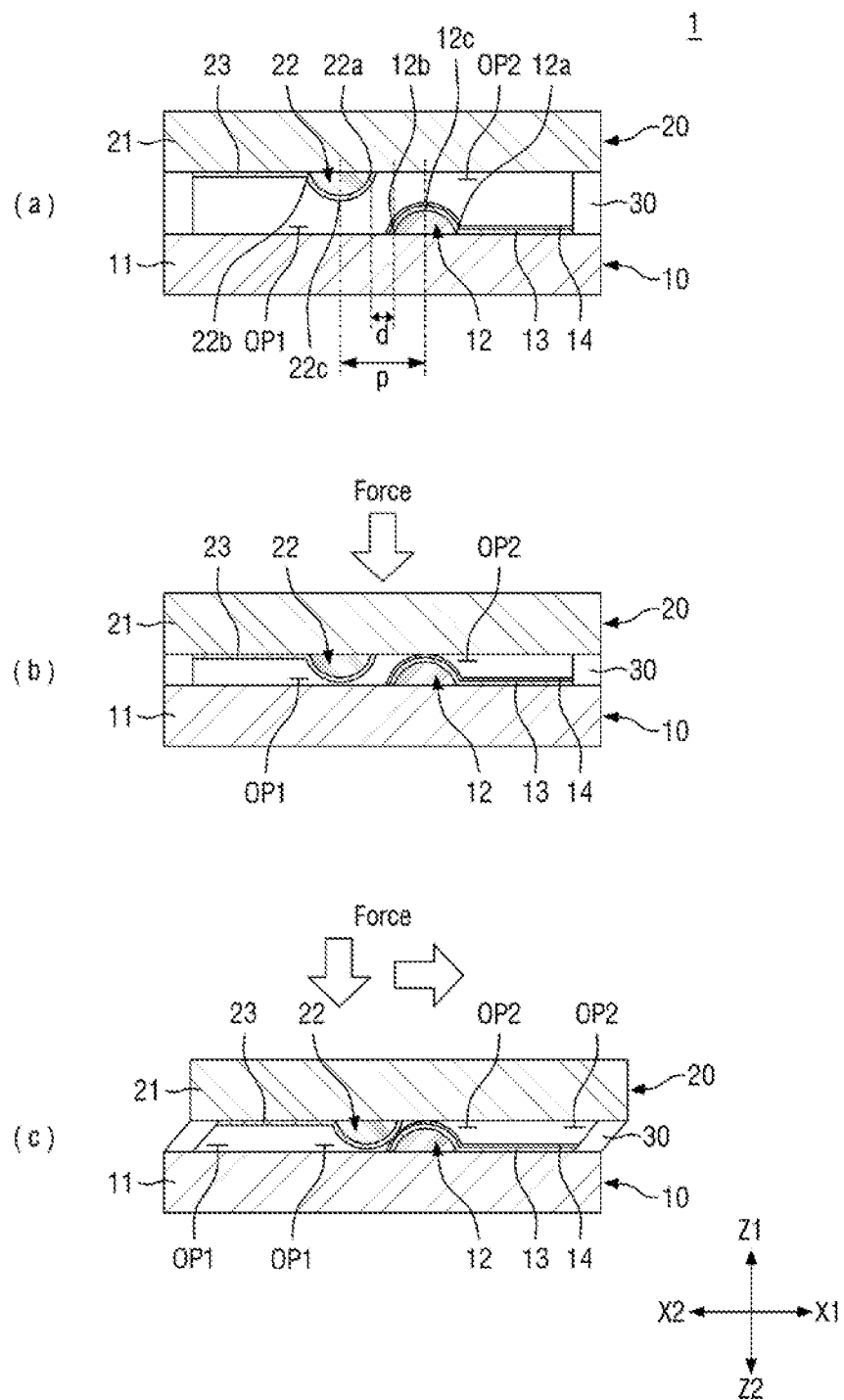
FIG. 1 illustrates cross-sectional views of a pressure sensor according to an exemplary embodiment of the present invention.

Exemplary embodiments of the present invention will be described more fully hereinafter with reference to the accompanying drawings. The inventive concept may, however, be embodied in many different forms and should not be construed as being limited to the embodiments set forth herein. Like reference numerals may refer to like elements throughout the specification.

As used herein, the singular forms "a", "an" and "the" are intended to include the plural forms as well, unless the context clearly indicates otherwise.

It will be understood that when an element or layer is referred to as being "on", "connected to" or "coupled to" another element or layer, it can be directly on, connected or coupled to the other element or layer or intervening elements or layers may be present.

In the drawings, components may be exaggerated or reduced in size for convenience of explanation.

A force sensor according to exemplary embodiments of the present invention includes a first electrode, a second electrode, and at least one force sensing layer. The first electrode and the second electrode may be separated from each other. One of the first electrode and the second electrode may be a driving electrode and the other may be a sensing electrode. The first electrode and the second electrode may not be in direct contact with each other. In a certain state, e.g., when the force sensor is pressed, the first electrode and the second electrode may get closer to each other, with the force sensing layer therebetween. When this happens, one surface of the force sensing layer comes into contact with the first electrode, and the other surface of the force sensing layer comes into contact with the second electrode, such that a current can flow between the first electrode and the second electrode through the force sensing layer.

FIG. 1 illustrates cross-sectional views of a force sensor according to an exemplary embodiment of the present invention. FIG. 1(*a*) shows a force sensor when it is not pressed; FIG. 1(*b*) shows the force sensor when it is pressed in a thickness direction; and FIG. 1(*c*) shows the force sensor when it is pressed in the thickness direction as well as in a horizontal direction.

Referring to FIG. 1(*a*), the force sensor 1 includes a first sensor element 10 and a second sensor element 20 facing each other. Each of the first sensor element 10 and the second sensor element 20 may be, but is not limited to, a film, a sheet, a plate, a panel or a stacked layer.

The first sensor element 10 and the second sensor element 20 may be spaced apart from each other in thickness directions Z1 and Z2. A supporter 30 may be disposed between the first sensor element 10 and the second sensor element 20 to maintain the spacing therebetween. The supporter 30 may be disposed on side portions of the first sensor element 10 and the second sensor element 20. The supporter 30 may be disposed along edges of the first sensor element 10 and the second sensor element 20 when viewed from above. A variety of layouts and shapes of the supporter 30 will be described later with reference to FIGS. 25 to 27.

The first sensor element 10 includes a first substrate 11, a first protrusion 12 disposed on the first substrate 11, a first electrode 13 disposed on the first protrusion 12, and a first force sensing layer 14 disposed on the first electrode 13. The second sensor element 20 includes a second substrate 21, a second protrusion 22 disposed on the second substrate 21, and a second electrode 23 disposed on the second protrusion 22.

The first substrate 11 and the second substrate 21 face each other. In the following description, the surfaces of the substrates 11 and 21 that face each other may be referred to as first surfaces, and the opposing surfaces of the substrates 11 and 21 may be referred to as second surfaces. The first protrusion 12 is disposed on the first surface of the first substrate 11, and the second protrusion 22 is disposed on the first surface of the second substrate 21.

A force or pressure may be input to the force sensor 1 through the second surface of the second substrate 21, as shown in the drawings. It is to be understood, however, that the present invention is not limited thereto. A force or pressure may be input either through the second surface of the first substrate 11 or through the second surface of the first substrate 11 as well as the second surface of the second substrate 21.

Each of the first substrate 11 and the second substrate 21 may include a material such as polyethylene, polyimide, polycarbonate, polysulfone, polyacrylate, polystyrene, polyvinyl chloride, polyvinyl alcohol, poly(norbornene), and poly ester. According to an exemplary embodiment of the present invention, each of the first substrate 11 and the second substrate 21 may be formed as a polyethylene terephthalate (PET) film or a polyimide film. It is to be understood, however, that the present invention is not limited thereto. Each of the first substrate 11 and the second substrate 21 may be made of glass, quartz, etc., or may be made of an insulating layer such as an organic insulating layer or an inorganic insulating layer.

The first protrusion 12 is disposed such that it protrudes from the first substrate 11 in the thickness direction Z1. The first protrusion 12 may protrude from the first surface of the first substrate 11 in a first thickness direction Z1. The first thickness direction Z1 is indicated by the arrow pointed toward the second substrate 21.

The second protrusion 22 is disposed such that it protrudes from the second substrate 21 in the thickness direction Z2. The second protrusion 22 may protrude from the first surface of the second substrate 21 in a second thickness direction Z2. The second thickness direction Z2 is indicated by the arrow pointed toward the first substrate 11.

The first protrusion 12 and the second protrusion 22 may be made of an insulating material. The first protrusion 12 and the second protrusion 22 may be made of an organic material or an inorganic material. For example, the first protrusion 12 and the second protrusion 22 may be made of a polyacrylic resin, a polyacrylate resin, a polyimide resin, or the like, or may be made of a silicone compound.

In exemplary embodiments of the present invention, the first protrusion 12 and the second protrusion 22 may be made of a material having elasticity. When the first protrusion 12 and the second protrusion 22 have a certain elasticity, they can absorb some of an externally applied force, such as a force in the thickness directions Z1 and Z2 or a shear force, to prevent damage to the elements of the force sensor 1. Further, each of the first and second protrusions 12 and 22 can be restored to its original shape after deformation by the force.

The first protrusion 12 and the second protrusion 22 may have, but are not limited to, a dome shape, a pyramid-like square pillar shape, a cylindrical shape, or the like. In the drawings, the first protrusion 12 and the second protrusion 22 have a dome shape.

According to an exemplary embodiment of the present invention, the width (e.g., the diameter of the lower end) of the first protrusion 12 and the second protrusion 22 may range from 100 μm to 500 μm. The height of each of the first protrusion 12 and the second protrusion 22 may range from 100 μm to 500 μm.

The first protrusion 12 and the second protrusion 22 may have substantially the same shape and size.

The first protrusion 12 and the second protrusion 22 may be disposed such that they do not overlap with each other at least partially in the thickness directions Z1 and Z2. In other words, the first protrusion 12 and the second protrusion 22 may be staggered when viewed from above. The first protrusion 12 and the second protrusion 22, which are staggered, form a pair of protrusions. Although FIG. 1 shows only one pair of protrusions, two or more pairs of protrusions may be provided.

The center 12c of the first protrusion 12 may be spaced apart from the center 22c of the second protrusion 22 by a certain distance p in the horizontal directions X1 and X2. For example, the center 12c of the first protrusion 12 may be spaced apart from the center 22c of the second protrusion 22 in a first linear direction X1, and the center 22c of the second protrusion 22 may be spaced apart from the center 12c of the first protrusion 12 in a second linear direction X2 opposite to the first linear direction X1.

It is to be noted that if the first protrusion 12 is spaced apart from the second protrusion 22 too far in the horizontal directions X1 and X2, the first protrusion 12 and the second protrusion 22 might not come into tight contact with each other by a shearing force. Accordingly, the distance d lies within a predetermined range. For example, the distance p between the center 12c of the first protrusion 12 and the center 22c of the second protrusion 22 in the first linear direction X1 may be smaller than the sum of the width of the first protrusion 12 and the width of the second protrusion 22.

The center 12c of the first protrusion 12 and the center 22c of the second protrusion 22 may refer to the center of the first protrusion 12 in the width direction and the center of the second protrusion 22 in the width direction, respectively. The first protrusion 12 and the second protrusion 22 may have the maximum protrusion height at their centers 12c and 22c, respectively.

FIG. 1(a) shows an example where the first protrusion 12 and the second protrusion 22 do not overlap with each other at all in the thickness directions Z1 and Z2.

The side of the first protrusion 12 and the second protrusion 22 indicated by the arrow X1 (e.g., the right side in FIG. 1) may be a "first side", and the opposing side indicated by the arrow X2 (e.g., the left side in FIG. 1) may be a "second side". If the first protrusion 12 does not overlap with the second protrusion 22 at all, the side surface of the first protrusion 12 on the second side does not overlap with the second protrusion 22, and the side surface of the second protrusion 22 on the first side does not overlap with the first protrusion 12. The terms "the side surface on the first side" and "the side surface on the second side" may refer to the outermost side surfaces in the respective directions, for example, the side surfaces near the lower end of the dome-like protrusion. A horizontal distance d between the side surface 12b on the second side of the first protrusion 12 and the side surface 22a on the first side of the second protrusion 22 may be smaller than the width of the first protrusion 12 (or the second protrusion 22) and may be equal to or less than half the width of the first protrusion 12 (or the second protrusion 22). In the drawings, the first protrusion 12 has the side surface on the first side 12a, and the second protrusion 22 has the side surface on the second side 22b. The side surface on the first side 12a is opposite the side surface 12b on the second side of the first protrusion 12. The side surface on the second side 22b is opposite the side surface 22a on the first side of the second protrusion 22.

The first electrode 13 is disposed on the first protrusion 12. The first electrode 13 covers the first protrusion 12 and extends from one side of the first protrusion 12 to the first surface of the first substrate 11 on which the first protrusion 12 is not disposed. The first electrode 13 is not disposed in a region on the first surface of the first substrate 11 including the area facing the center 22c of the second protrusion 22. The region where the first electrode 13 is not disposed is a first opening area OP1. In the first opening area OP1, the first surface of the first substrate 11 is exposed without being covered by the first electrode 13. The first opening area OP1 overlaps with the center 22c of the second protrusion 22 that it faces. Furthermore, the first opening area OP1 may overlap with the entire second protrusion 22. The width of the first opening area OP1 may be equal to or greater than the width of the second protrusion 22. According to an exemplary embodiment of the present invention, the width of the first opening area OP1 may be one to four times the width of the second protrusion 22, for example, approximately two times.

The second electrode 23 is disposed on the second protrusion 22. The second electrode 23 covers the second protrusion 22 and extends from the side surface of the second protrusion 22 to the first surface of the second substrate 21 on which the second protrusion 22 is not disposed. The second electrode 23 is not disposed in a region on the first surface of the second substrate 21 including the area facing the center 12c of the first protrusion 12. The region where the second electrode 23 is not disposed is a second opening area OP2. In the second opening area OP2, the first surface of the second substrate 21 is exposed without being covered by the second electrode 23. The second opening area OP2 overlaps with the center 12c of the first protrusion 12 that it faces. Furthermore, the second opening area OP2 may overlap with the entire first protrusion 12. The width of the second opening area OP2 may be equal to or greater than the width of the first protrusion 12. According to an exemplary embodiment of the present invention, the width of the second opening area OP2 may be one to four times the width of the first protrusion 12, for example, approximately two times.

Each of the first opening area OP1 and the second opening area OP2 may have a circular shape, an elliptical shape, a rectangular shape, or the like when viewed from above, as well as various other shapes. When the first and second opening areas OP1 and OP2 have an elongated shape in one direction, a longitudinal direction may be the same as the above-described linear directions X1 and X2.

A part of the first opening area OP1 on the second side of the first protrusion 12 and a part of the second opening area OP2 on the first side of the second protrusion 22 may overlap in the thickness directions Z1 and Z2.

Each of the first electrode 13 and the second electrode 23 may include a conductive material such as silver (Ag) and copper (Cu). The first electrode 13 and the second electrode 23 may be formed, for example, by screen printing. In some exemplary embodiments of the present invention, the first electrode 13 and the second electrode 23 may be made of a transparent, conductive oxide layer such as ITO and IZO, or a transparent, conductive material such as a nanowire, a carbon nanotube and a conductive polymer.

Thicknesses of the first electrode 13 and the second electrode 23 may be, but are not limited to, 2 μm to 8 μm, or approximately 4 μm.

The first force sensing layer 14 is disposed on the first electrode 13. The first force sensing layer 14 may have substantially the same pattern shape as the first electrode 13. The first surface of the first substrate 11 may be exposed without being covered by the first force sensing layer 14 in the first opening area OP1.

The first force sensing layer 14 may comprise a pressure sensitive material. The pressure sensitive material may include metal nanoparticles such as nickel, aluminum, tin, copper, or carbon. The pressure sensitive material may be dispersed in a polymer resin in the form of particles. It is to be understood, however, that the present invention is not limited thereto.

The first force sensing layer 14 may be thicker than the first electrode 13. The thickness of the first force sensing layer 14 may range from 4 μm to 12 μm, e.g., approximately 8 μm.

Figure 2:
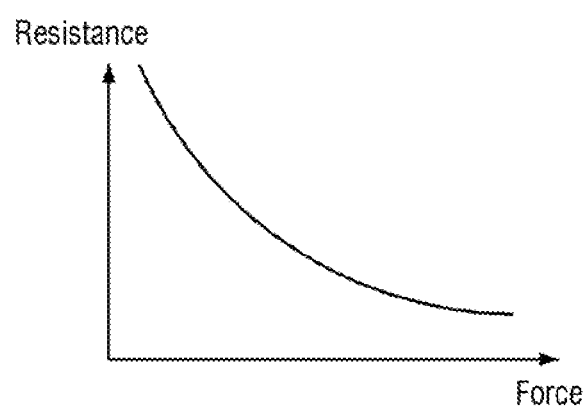
FIG. 2 is a graph illustrating electrical resistance verses force of a first force sensing layer according to an exemplary embodiment of the present invention.

FIG. 2 is a graph illustrating electrical resistance verses force of the first force sensing layer according to an exemplary embodiment of the present invention.

Referring to FIG. 2, as the force applied to the first force sensing layer 14 increases, the electrical resistance decreases. By using this characteristic, it is possible to sense whether a force is applied and the magnitude of the applied force.

For example, assume that a driving voltage is applied to the first electrode 13 and a current amount or voltage flowing in the second electrode 23 is sensed. When the force sensor 1 is not pressed as shown in FIG. 1(a), no current flows from the first electrode 13 to the second electrode 23 because the first electrode 13 and the second electrode 23 are spaced apart from each other. In other words, they are electrically disconnected from each other.

As shown in FIG. 1(b), if a force is applied in the second thickness direction Z2 from the second surface of the second substrate 21, the distance between the first substrate 11 and the second substrate 21 is reduced. In this case, the first force sensing layer 14 disposed on the part of the first electrode 13 on the first protrusion 12 is brought into contact with the first surface of the second substrate 21 exposed via the second opening area OP2. In addition, the part of the second electrode 23 on the second protrusion 22 may be brought into contact with the first surface of the first substrate 11 exposed via the first opening area OP1. As the force in the second thickness direction Z2 increases, the force transmitted to the first force sensing layer 14 may increase while the resistance of the first force sensing layer 14 may decrease. Since the first force sensing layer 14 is in contact with the first surface of the second substrate 21 in the second opening area OP2, but is electrically disconnected from the second electrode 23, no current flows in the second electrode 23 even, e.g., if a driving voltage is applied to the first electrode 13.

As shown in FIG. 1(c), when a force in the second thickness direction Z2 and a force in the first linear direction X1 (e.g., a shearing force), which is the horizontal direction, are applied simultaneously, the second protrusion 22 moves, e.g., down and across. If a force (e.g., a shearing force) equal to or greater than a threshold value is applied, the second electrode 23 on the second protrusion 22 comes in contact with the first force sensing layer 14 disposed on the first electrode 13 on the first protrusion 12. When the shear force is relative weak and the force transmitted to the first force sensing layer 14 is small, the resistance of the first force sensing layer 14 is high, such that current hardly flows to the second electrode 23. On the other hand, when the shear force is strong and the force applied to the first force sensing layer 14 is increased, the resistance of the first force sensing layer 14 is low, such that a current flows from the first electrode 13 to the second electrode 23 through the first force sensing layer 14. Therefore, it is possible to determine whether there is a shear force in the first linear direction X1 and, if there is a shear force, to sense the magnitude thereof, by checking the amount of current or voltage sensed by the second electrode 23.

In contrast to the example shown, when a force is applied in the second linear direction X2, the distance p between the center 12c of the first protrusion 12 and the center 22c of the second protrusion 22 is increased. Therefore, the first electrode 13 and the second electrode 23 do not come in contact with each other with the first force sensing layer 14 therebetween, such that no sensing current would be detected at the second electrode 23. To sense the shear force in the second linear direction X2, the positions of the first protrusion 12 and the second protrusion 22 may be reversed in the horizontal directions X1 and X2. Examples of how to detect and sense a shear force in various directions by re-arranging the first and second protrusions 12 and 22 will be described in detail below with reference to FIG. 11.

Figure 3:
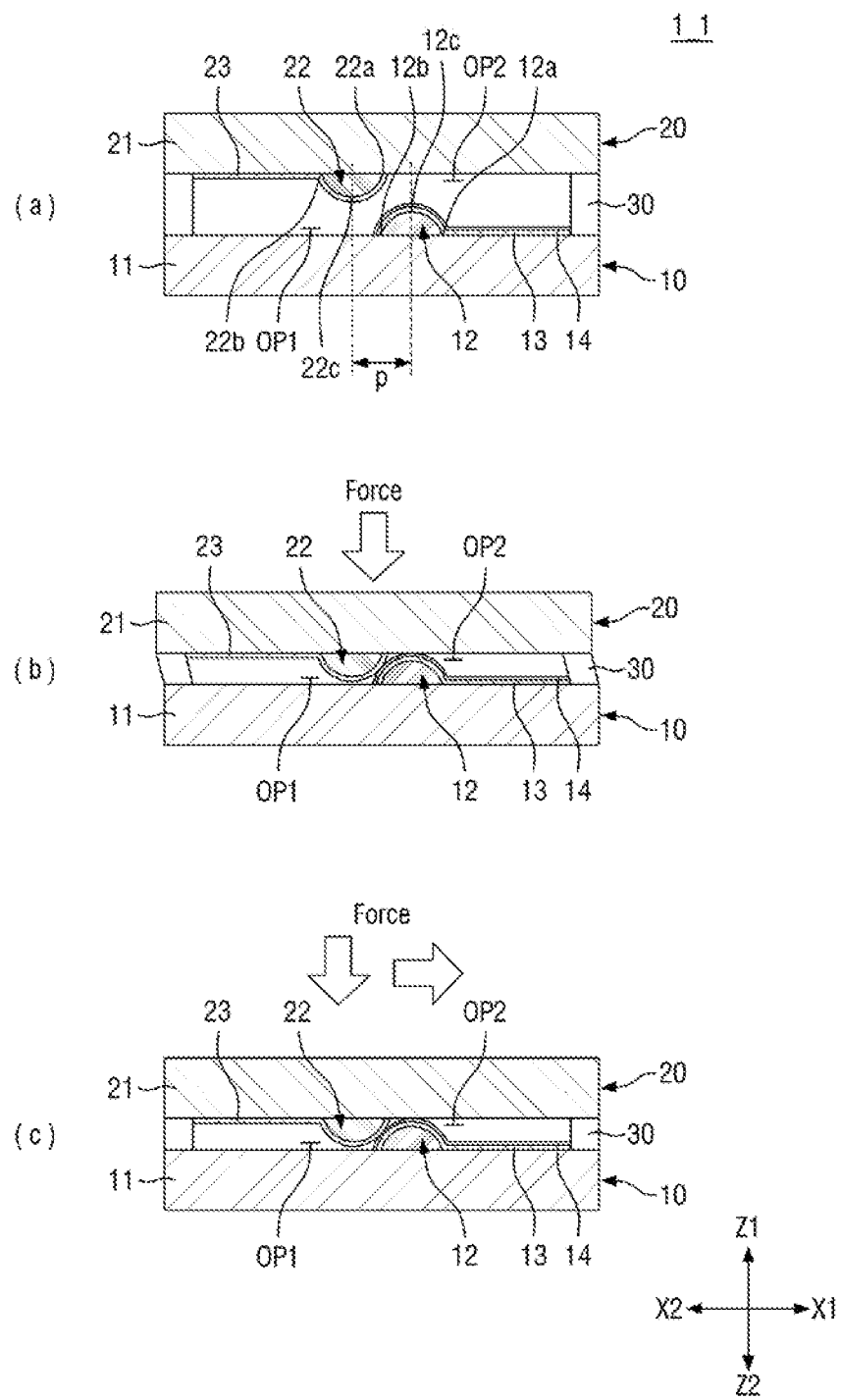
FIG. 3 illustrates cross-sectional views of a pressure sensor according to another exemplary embodiment of the present invention.

FIG. 3 illustrates cross-sectional views of a force sensor according to another exemplary embodiment of the present invention. FIG. 3(a) shows a force sensor when it is not pressed; FIG. 3(b) shows the force sensor 1 when it is pressed in the thickness directions Z1 and Z2; and FIG. 3(c) shows the force sensor when it is pressed in the thickness directions Z1 and Z2 as well as in the horizontal direction.

FIG. 3(a) shows an example where the first protrusion 12 and the second protrusion 22 overlap with each other partially in the thickness directions Z1 and Z2.

Referring to FIG. 3(a), when a force sensor 1_1 is not pressed, the first protrusion 12 and the second protrusion 22 partially overlap with each other.

For example, the side surface 12b on the second side of the first protrusion 12 overlaps with the second protrusion 22, and the side surface 22a on the first side of the second protrusion 22 overlaps with the first protrusion 12. The portion of the second protrusion 22 overlapping with the side surface 12b of the first protrusion 12 may extend from the center 22c of the second protrusion 22 to the first side of the second protrusion 22 (in the first linear direction X1). The portion of the first protrusion 12 overlapping with the side surface 22a of the second protrusion 22 may extend from the center 12c of the first protrusion 12 to the second side of the first protrusion 12 (in the second linear direction X2). The width in the horizontal direction in which the first protrusion 12 and the second protrusion 22 overlap with each other may be smaller than half the width of the first protrusion 12 (or the second protrusion 22). In an exemplary embodiment of the present invention, the side surface 22a of the second protrusion 22 and the side surface 12b of the first protrusion 12 overlap in the thickness directions Z1 and Z2 and may be aligned with each other.

As shown in FIG. 3(b), if a force is applied in the second thickness direction Z2 from the second surface of the second substrate 21, the distance between the first substrate 11 and the second substrate 21 is reduced. In this case, the first force sensing layer 14 disposed on the part of the first electrode 13 on the first protrusion 12 is brought into contact with the first surface of the second substrate 21 exposed via the second opening area OP2, and the part of the second electrode 23 on the second protrusion 22 may be brought into contact with the first surface of the first substrate 11 exposed via the first opening area OP1. When this happens, the part of the second electrode 23 disposed on the side of the second protrusion 22 (e.g., the portion extended in the first linear direction X1 from the center 22c) may come in contact with the part of the first force sensing layer 14 disposed on the first electrode 13 on the side of the first protrusion 12 (e.g., the portion extended in the second linear direction X2 from the center 12c). However, since the parts of the first and second electrodes 13 and 23 come in contact with each other at an inclined angle, the first force sensing layer 14 does not receive a sufficient force, and thus, the resistance of the first force sensing layer 14 is high. Accordingly, no current or a small amount of current flows to the second electrode 23.

In FIG. 3(b), when the first substrate 11 and the second substrate 21 approach to each other, if the force sensor 1_1 is further pressed in the thickness direction Z2 even after the first protrusion 12 and the second protrusion 22 overlapping with each other have been pressed, the second protrusion 22 of the second substrate 21 may be shifted toward the second side of the second protrusion 22. Accordingly, as shown in FIG. 3(b), the second substrate 21 may be slightly shifted to the left relative to the first substrate 11.

As shown in FIG. 3(c), when a force in the second thickness direction Z2 and a force in the first linear direction X1 (e.g., a shearing force), which is the horizontal direction, are applied simultaneously, the second protrusion 22 moves, e.g., down. Then, the second electrode 23 on the second protrusion 22 comes into tight contact with the first force sensing layer 14 disposed on the first electrode 13 on the first protrusion 12. As a shear force is increased, the force applied to the first force sensing layer 14 is increased, and accordingly, the resistance of the first force sensing layer 14 is lowered so that a current may flow from the first electrode 13 toward the second electrode 23 through the first force sensing layer 14. The amount of current or voltage flowing to the second electrode 23 in the state shown in FIG. 3(c) is different from the amount of current or voltage flowing to the second electrode 23 in the state shown in FIG. 3(b). Therefore, it is possible to determine whether or not the shear force is applied by checking the amount of current or voltage and, if the shear force is applied, to sense the magnitude thereof.

Figure 4:
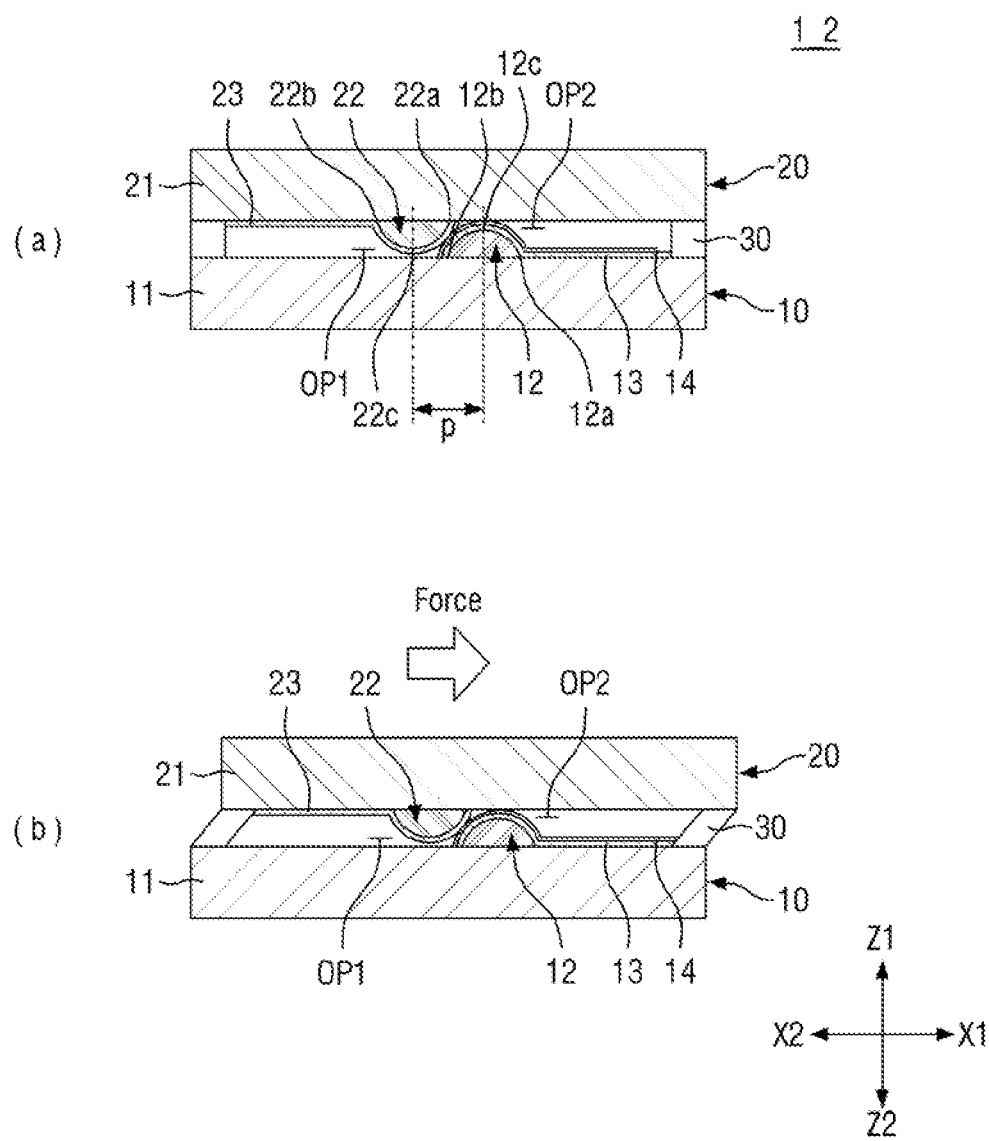
FIG. 4 illustrates cross-sectional views of a pressure sensor according to yet another exemplary embodiment of the present invention.

FIG. 4 illustrates cross-sectional views of a force sensor according to yet another exemplary embodiment of the present invention. FIG. 4(a) shows a force sensor 1_2 when it is not pressed, and FIG. 4(b) shows the force sensor 1_2 when it is pressed in the horizontal direction. FIG. 4 illustrates an example where the spacing between the first substrate 11 and the second substrate 21 is already narrow in the thickness directions Z1 and Z2 when the force sensor 1_2 is not pressed.

Referring to FIG. 4(a), when the force sensor 12 is not pressed, the first force sensing layer 14 disposed on the first electrode 13 on the first protrusion 12 comes in contact with the first surface of the second substrate 21 exposed through the second opening area OP2. In addition, the second electrode 23 on the second protrusion 22 comes in contact with the first surface of the first substrate 11 exposed through the first opening area OP1. The second electrode 23 disposed on the first side of the second protrusion 22 may come in contact the first force sensing layer 14 disposed on the first electrode 13 on the second side of the first protrusion 12. However, since they come in contact with each other at an inclined angle, the first force sensing layer 14 does not receive a sufficient force, and thus, the resistance of the first force sensing layer 14 is high, so no current or a small amount of current flows to the second electrode 23.

As shown in FIG. 4(b), when a force in the first linear direction X1 (e.g., a shearing force), which is the horizontal direction, is applied, the second protrusion 22 moves in one direction, e.g., to the right. Then, the second electrode 23 on the second protrusion 22 comes into tight contact with the first force sensing layer 14 disposed on the first electrode 13 on the first protrusion 12. As a shear force is increased, the force applied to the first force sensing layer 14 is increased, and accordingly, the resistance of the first force sensing layer 14 is lowered so that a current may flow from the first electrode 13 toward the second electrode 23 through the first force sensing layer 14. Thus, it is possible to determine whether or not the shear force is applied and, if the shear force is applied, to sense the magnitude thereof.

Hereinafter, a variety of force sensors according to exemplary embodiments of the present invention will be described.

Figure 5:
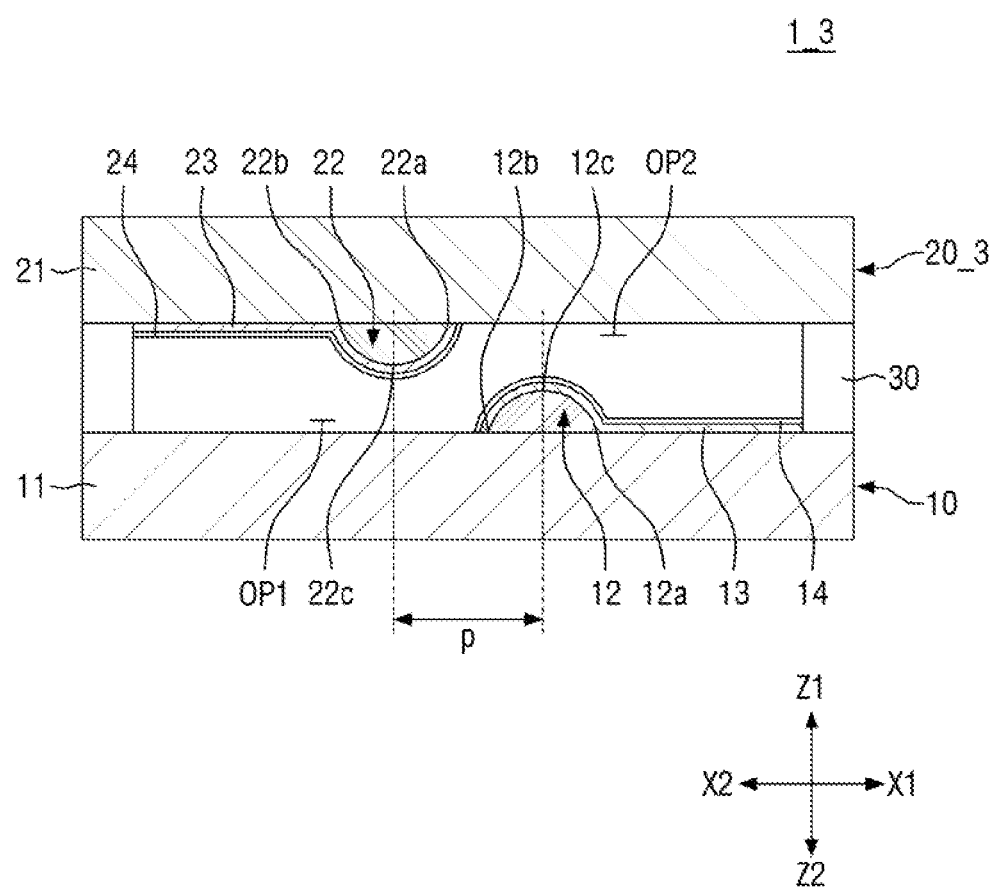
FIG. 5 is a cross-sectional view of a force sensor according to yet another exemplary embodiment of the present invention.

FIG. 5 is a cross-sectional view of a force sensor according to another exemplary embodiment of the present invention.

A force sensor 1_3 according to the exemplary embodiment shown in FIG. 5 is substantially identical to the force sensor 1 shown in FIG. 1 except that a second sensor element 20_3 also includes a force sensing layer.

For example, a second force sensing layer 24 is disposed on the second electrode 23 of the second sensor element 20_3 of the force sensor 1_3. The second force sensing layer 24 may have substantially the same pattern shape as the second electrode 23. The first surface of the second substrate 21 may be exposed without being covered by the second force sensing layer 24 in the second opening area OP2.

The second force sensing layer 24 may include a pressure sensitive material, like the first force sensing layer 14. The second force sensing layer 24 may perform the same function as the first force sensing layer 14.

According to the exemplary embodiment shown in FIG. 5, when the second protrusion 22 is moved toward the first protrusion 12 by a shear force, the second force sensing layer 24 disposed on the second electrode 23 on the second protrusion 22 and the first force sensing layer 14 disposed on the first electrode 13 on the first protrusion 12 come in contact with each other. The resistances of the first force sensing layer 14 and the second force sensing layer 24 change according to the magnitude of the force transmitted to them. When the resistances of the first force sensing layer 14 and the second force sensing layer 24 are lowered, a current may flow from the first electrode to the second electrode 23 through the first force sensing layer 14 and the second force sensing layer 24. Therefore, it is possible to determine whether there is a shear force in the first linear direction X1 and if there is the shear force, to sense the magnitude thereof by checking the amount of current or voltage sensed by the second electrode 23.

Figure 6:
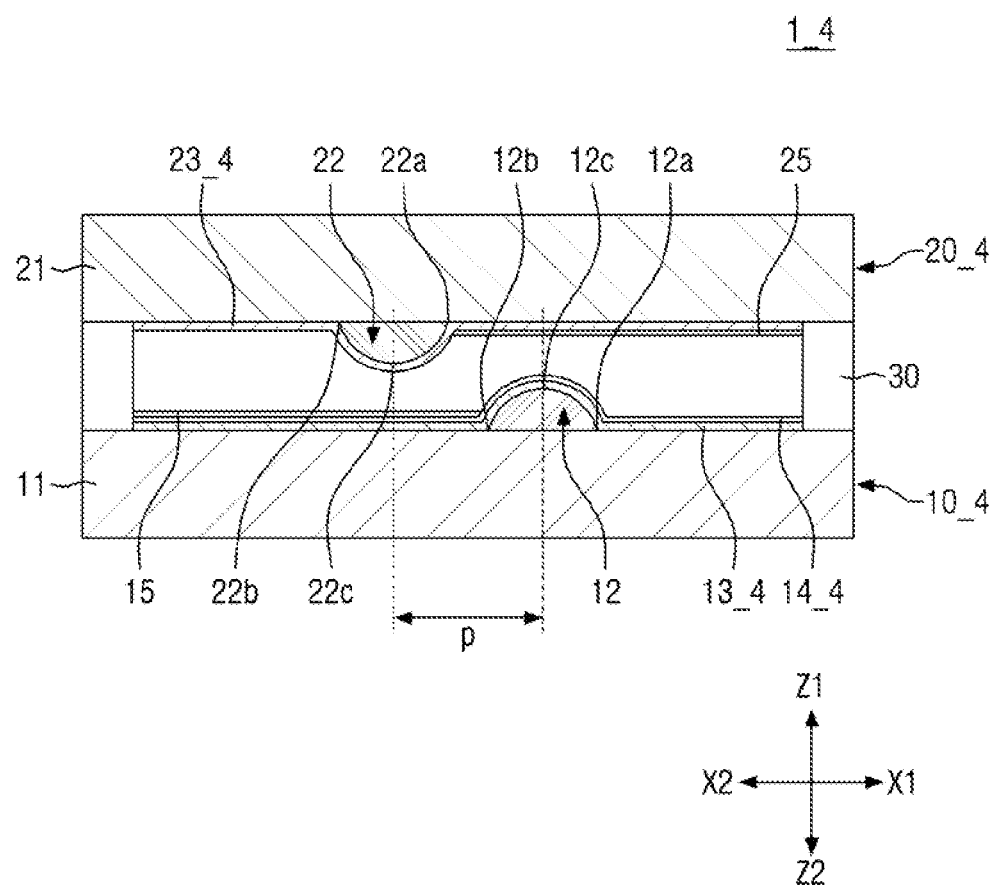
FIG. 6 is cross-sectional view of a force sensor according to yet another exemplary embodiment of the present invention.

FIG. 6 is cross-sectional view of a force sensor according to yet another exemplary embodiment of the present invention.

A force sensor 1_4 according to the exemplary embodiment shown in FIG. 6 is substantially identical to the force sensor 1 shown in FIG. 1 except that a first electrode 13_4, a first force sensing layer 14_4, and a second electrode 23_4 are formed without a first opening area and a second opening area. In addition, insulating layers 15 and 25 are disposed at the positions of the first opening area and the second opening area, respectively.

For example, the first electrode 13_4 of the first sensor element 10_4 covers the first protrusion 12, and is extended from both sides of the first protrusion 12 to the first surface of the first substrate 11 where the first protrusion 12 is not disposed. The first electrode 13_4 is extended to a region facing the center 22c of the second protrusion 22. The first electrode 13_4 may cover the entire first surface of the first substrate 11. The first force sensing layer 14_4 is disposed on the first electrode 13_4. The first force sensing layer 14_4 may cover the entire surface of the first electrode 13_4. According to the present embodiment, the first electrode 13_4 and the first force sensing layer 14_4 are disposed in the region facing the center 22c of the second protrusion 22, and thus, the first opening area OP1 such as one shown in FIG. 1 may not be provided.

The second electrode 23_4 of a second sensor element 20_4 covers the second protrusion 22 and extends from the side surfaces of the second protrusion 22 to the first surface of the second substrate 21 on which the second protrusion 22 is not disposed. The second electrode 23_4 is extended to a region facing the center 12c of the first protrusion 12. The second electrode 23_4 may cover the entire first surface of the second substrate 21. According to the present embodiment, the second electrode 23_4 is disposed in the region facing the center 12c of the first protrusion 12, and thus, the second opening area OP2 such as the one shown in FIG. 1 may not be formed.

The first insulating layer 15 may be disposed on the first force sensing layer 14_4, and the second insulating layer 25 may be disposed on the second electrode 23_4.

The first insulating layer 15 is disposed in a region on the first force sensing layer 14_4 including the area facing the center 22c of the second protrusion 22. The first insulating layer 15 is disposed such that the first force sensing layer 14_4 disposed on the first electrode 13_4 on the first protrusion 12 is exposed at least partially. The shape of the first insulating layer 15 when viewed from above may be substantially identical to the first opening area OP1 in FIG. 1.

The second insulating layer 25 is disposed in a region on the second electrode 23_4 including the area facing the center 12c of the first protrusion 12. The second insulating layer 25 is disposed such that the second electrode 23_4 on the second protrusion 22 is exposed at least partially. The shape of the second insulating layer 25 when viewed from above may be substantially identical to the second opening area OP2 in FIG. 1.

According to this present embodiment, when the distance between the first substrate 11 and the second substrate 21 is reduced by pressing in the thickness directions Z1 and Z2, the surface of the first force sensing layer 14_4 disposed on the first electrode 13_4 on the first protrusion 12 may come into contact with the second insulating layer 25. In addition, the second electrode 23_4 on the second protrusion 22 may come in contact with the first insulating layer 15. Therefore, when a force is received in the thickness directions Z1 and Z2, the flow of the current from the first electrode 13_4 to the second electrode 23_4 can be effectively blocked by the first insulating layer 15 and the second insulating layer 25. As a consequence, noise in the sensing shear force can be prevented. On the other hand, when a force is received in the first linear direction X1, which is the horizontal direction, the first force sensing layer 14_4 may come into direct contact with the second electrode 23_4, so that a current may flow. Accordingly, it is possible to determine whether there is a shear force and to sense its magnitude.

Figure 7:
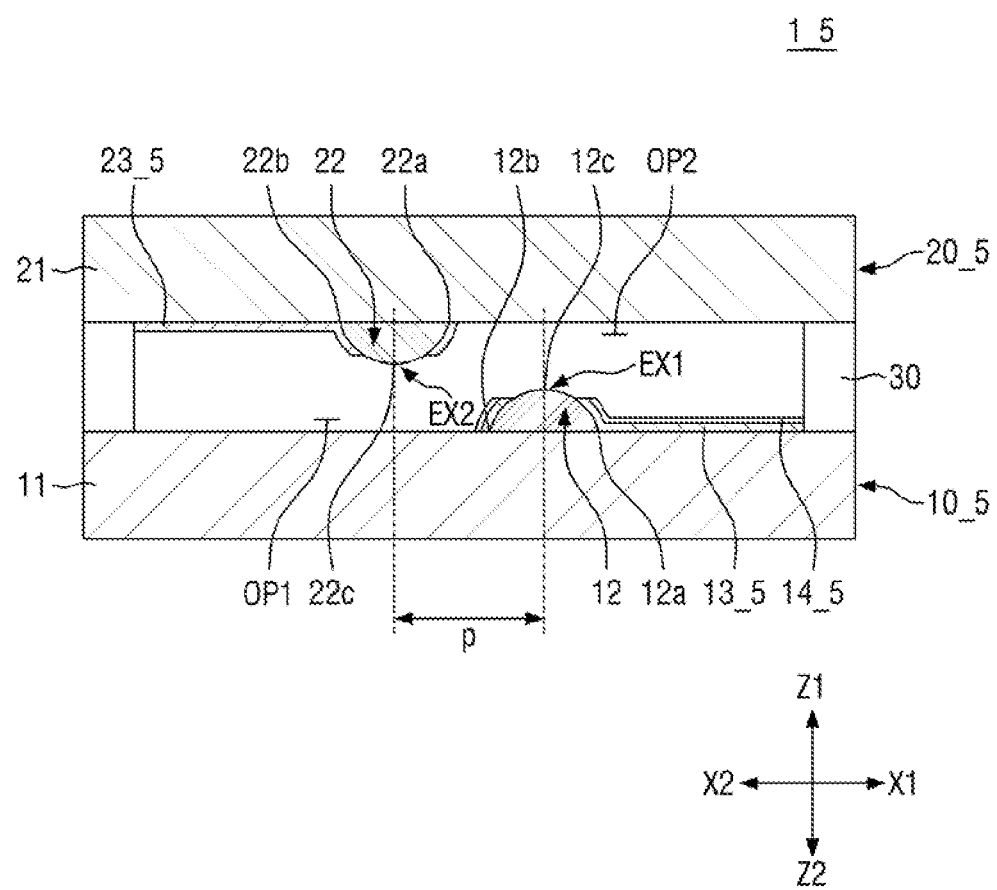
FIG. 7 is cross-sectional view of a force sensor according to yet another exemplary embodiment of the present invention.

FIG. 7 is cross-sectional view of a force sensor according to yet another exemplary embodiment of the present invention.

A force sensor 1_5 according to the exemplary embodiment shown in FIG. 7 is substantially identical to the force sensor 1 shown in FIG. 1 except that a first electrode 13_5 and a first force sensing layer 14_5 are patterned so that the first protrusion 12 is exposed, and a second electrode 23_5 is patterned so that the second protrusion 22 is exposed.

For example, a first sensor element 10_5 includes a first protrusion opened portion EX1 that exposes the center 12c of the first protrusion 12, and a second sensor element 20_5 includes a second protrusion opened portion EX2 that exposes the center 22c of the second protrusion 22. The first and second protrusion opened portions EX1 and EX2 expose the center 12c of the first protrusion 12 and the center 22c of the second protrusion 22 but not their peripheral portions.

Therefore, when the force sensor 1_5 receives a force in the thickness directions Z1 and Z2, even though the exposed top of the center 12c of the first protrusion 12 comes into contact with the first surface of the second substrate 21, and the exposed top of the center 22c of the second protrusion 22 comes into contact with the first surface of the first substrate 11, the flow of current from the first electrode 13_5 to the second electrode 23_5 can be completely blocked. This is so, because there is no electrode at the contact areas. On the other hand, when a force is received in the first linear direction X1, which is the horizontal direction, the first force sensing layer 14_5 may come into direct contact with the second electrode 23_5, so that a current may flow. Accordingly, it is possible to determine whether there is a shear force and to sense its magnitude.

Figure 8:
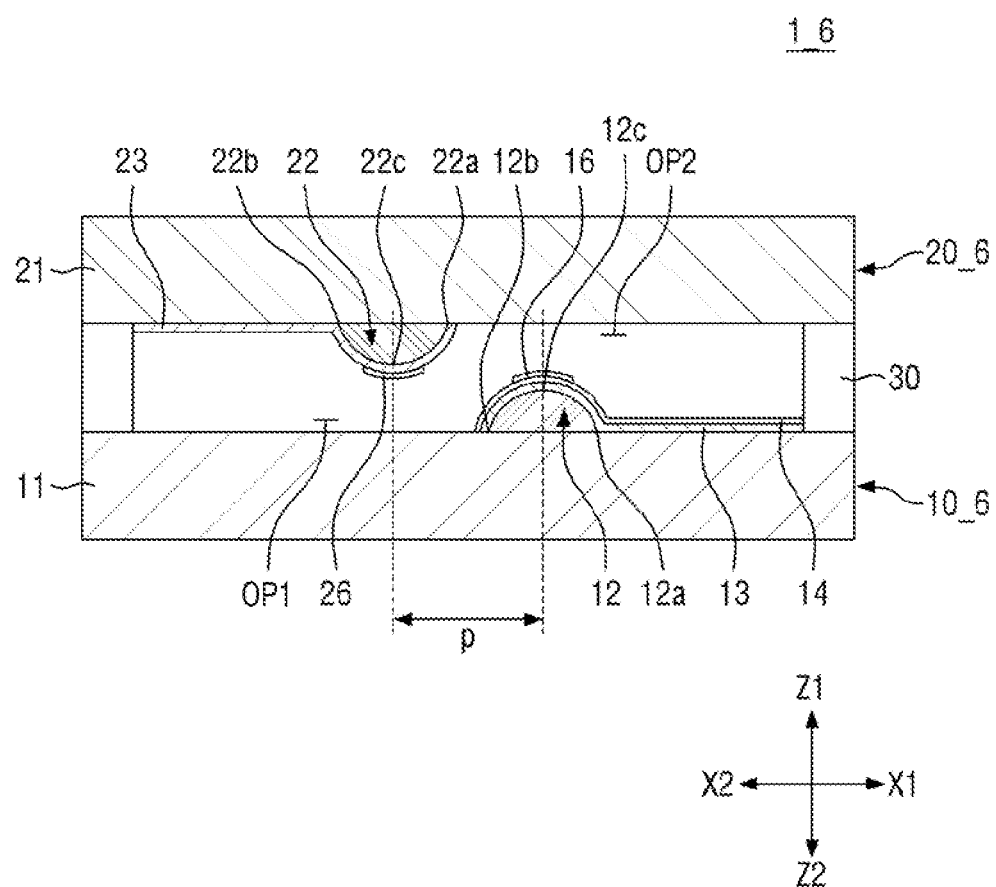
FIG. 8 is cross-sectional view of a force sensor according to yet another exemplary embodiment of the present invention.

FIG. 8 is cross-sectional view of a force sensor according to yet another exemplary embodiment of the present invention.

A force sensor 1_6 according to the exemplary embodiment shown in FIG. 8 is substantially identical to the force sensor 1 shown in FIG. 1 except that first and second insulating patterns 16 and 26 are disposed on the first force sensing layer 14 disposed on the first protrusion 12 and on the second electrode 23 disposed on the second protrusion 22, respectively.

For example, the first insulating pattern 16 is disposed on the first force sensing layer 14 of a first sensor element 10_6, and the second insulating pattern 26 is disposed on the second electrode 23 of a second sensor element 206. The first insulating pattern 16 overlaps with the center 12c of the first protrusion 12 but not with the peripheral portion of the first protrusion 12; therefore, the first force sensing layer 14 on the peripheral portion of the first protrusion 12 is exposed. The second insulating pattern 26 overlaps with the center 22c of the second protrusion 22 but not with the peripheral portion of the second protrusion 22; therefore, the second electrode 23 on the peripheral portion of the second protrusion 22 is exposed. The first insulating pattern 16 and the second insulating pattern 26 may have substantially the same shape as the first protrusion opened portion EX1 and the second protrusion opened portion EX2 of FIG. 7 when viewed from above.

According to the present embodiment, when the force sensor 1_6 receives a force in the thickness directions Z1 and Z2, the first insulating pattern 16 on the center 12c of the first protrusion 12 comes into contact with the first surface of the second substrate 21, and the second insulating pattern 26 on the center 22c of the second protrusion 22 comes into contact with the first surface of the first substrate 1_1, as a result, the flow of the current from the first electrode 13 to the second electrode 23 can be completely blocked. This is so, because there is no electrode at the contact areas, and thus, insulation is achieved by the insulating patterns 16 and 26. On the other hand, when a force is received in the first linear direction X1, which is the horizontal direction, the first force sensing layer 14 may come into direct contact with the second electrode 23, so that a current may flow. Accordingly, it is possible to determine whether there is a shear force and to sense its magnitude.

Figure 9:
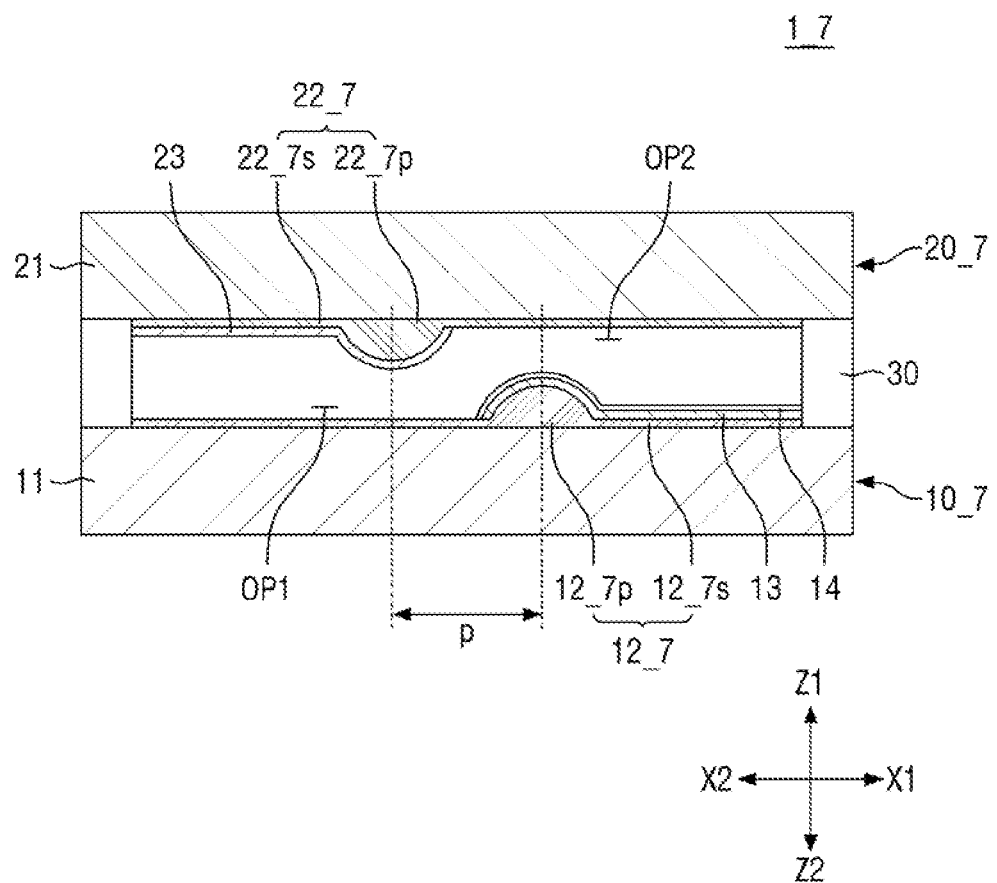
FIG. 9 is a cross-sectional view of a force sensor according to yet another exemplary embodiment of the present invention.

FIG. 9 is a cross-sectional view of a force sensor according to yet another exemplary embodiment of the present invention.

A force sensor 1_7 according to the exemplary embodiment shown in FIG. 9 is substantially identical to the force sensor 1 shown in FIG. 1 except that a first protrusion 12_7p is integrally formed on a first body portion 12_7s covering the first surface of the first substrate 11, and a second protrusion portion 22_7p is integrally formed on a second body portion 22_7s covering the side surface of the second substrate 21.

For example, a first sensor element 10_7 includes a first protrusion layer 12_7 including the first body portion 12_7s and the first protrusion portion 12_7p protruded from the surface of the first body portion 12_7s in the first thickness direction Z1. A second sensor element 20_7 includes a second protrusion layer 22_7 including the second body portion 22_7s and the second protrusion portion 22_7p protruded from the surface of the second body portion 22_7s in the second thickness direction Z2. The first body portion 12_7s may cover the entire first surface of the first substrate 11, and the second body portion 22_7s may cover the entire first surface of the second substrate 21. The first protrusion portion 12_7p and the second protrusion portion 22_7p correspond to the first protrusion 12 and the second protrusion 22 of FIG. 1, respectively.

The force sensor according to the present embodiment can be used to determine whether there is a shear force and to sense its magnitude, in the same manner described above with reference to FIG. 1.

Figure 10:
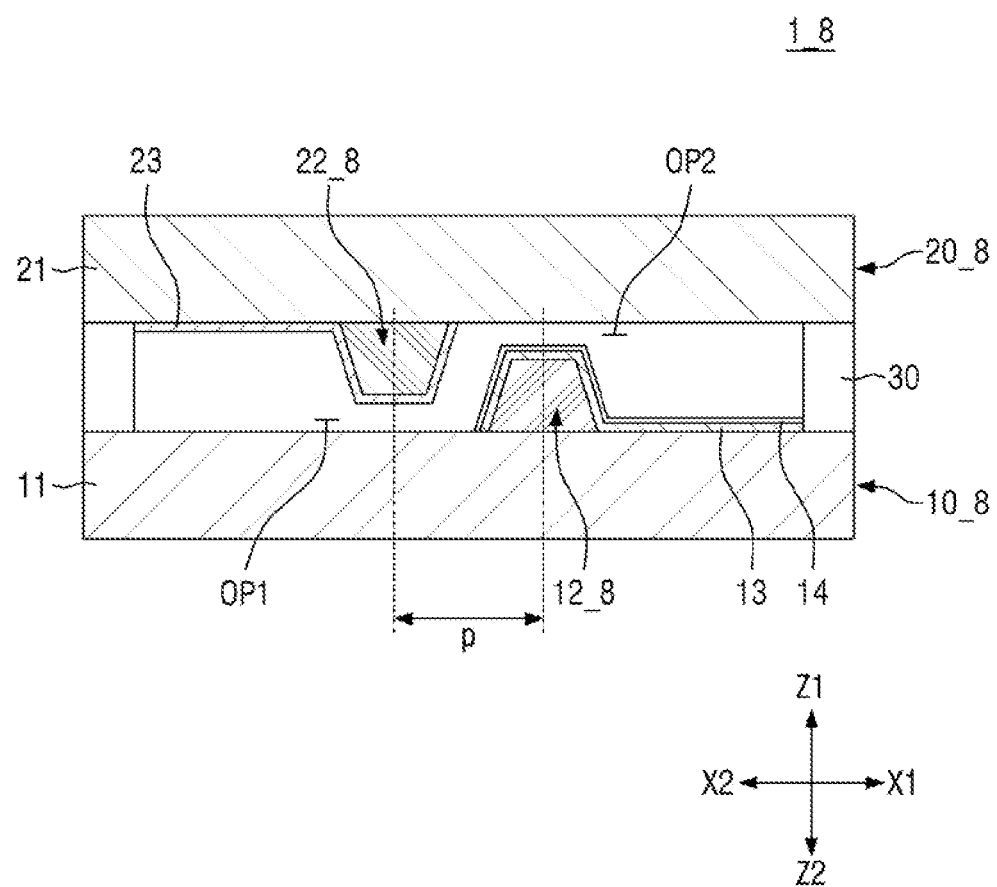
FIG. 10 is cross-sectional view of a force sensor according to yet another exemplary embodiment of the present invention.

FIG. 10 is cross-sectional view of a force sensor according to yet another exemplary embodiment of the present invention.

According to the exemplary embodiment of FIG. 10, a first protrusion 12_8 of a first sensor element 10_8 and a second protrusion 22_8 of a second sensor element 20_8 may have a trapezoidal cross section.

For example, the first protrusion 12_8 and the second protrusion 22_8 may have a pyramid-like, rectangular column shape that becomes narrower in the protruding direction. It is to be understood, however, that the present invention is not limited thereto. The first protrusion 12_8 and the second protrusion 22_8 may have other polygonal column or cylindrical shapes. The side inclination angles of the first protrusion 12_8 and the second protrusion 22_8 may be, but are not limited to, equal to each other.

According to the present embodiment, when the force sensor 1_8 receives a shearing force, the contact area between the first force sensing layer 14 on the second side of the first protrusion 12_8 and the second electrode 23 on the first side of the second protrusion 22_8 becomes larger than that of the force sensor 1 of FIG. 1. Accordingly, the amount of current flowing from the first electrode 13 to the second electrode 23 increases, allowing for more precise sensing.

Hereinafter, the above-described force sensor, according to an exemplary embodiment of the present invention, will be described in detail.

Figure 11:
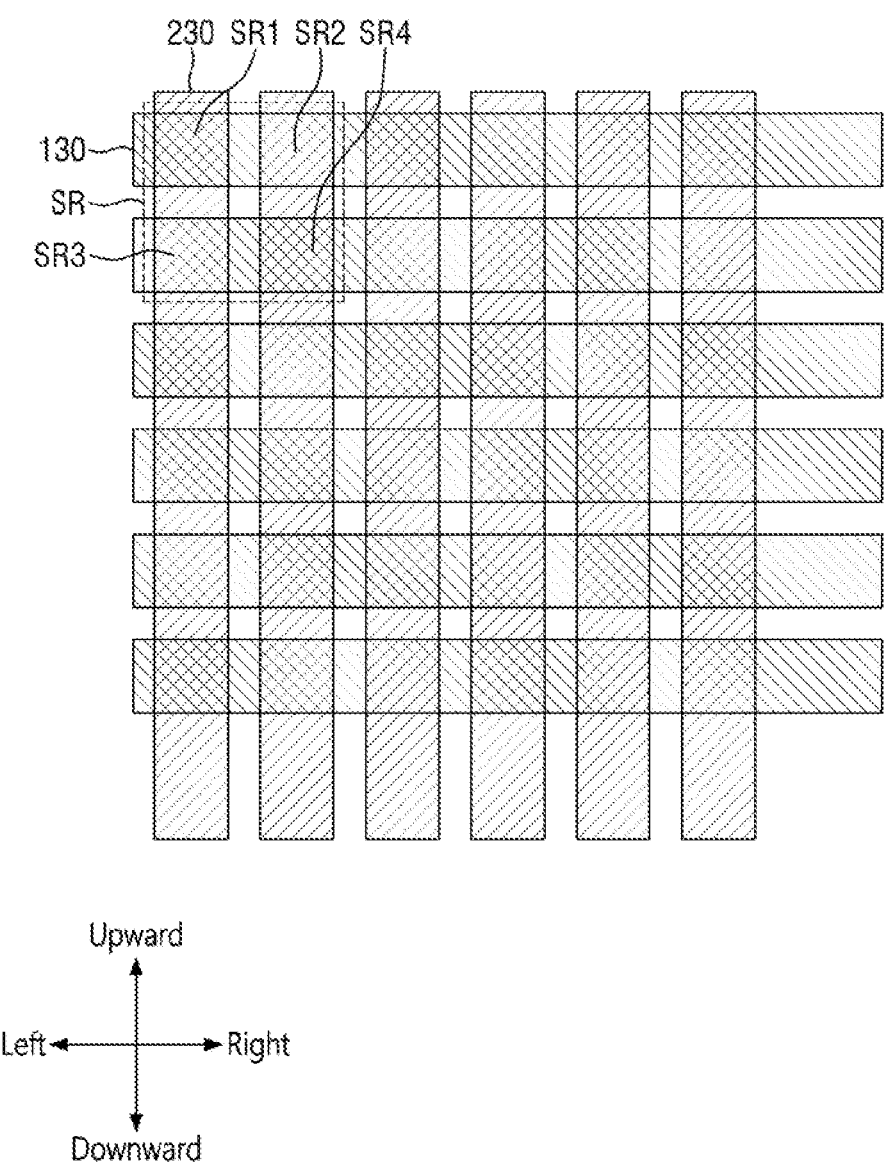
FIG. 11 is a plan view showing the layout of a force sensor according to an exemplary embodiment of the present invention when viewed from above.

FIG. 11 is a plan view showing the layout of a force sensor according to an exemplary embodiment of the present invention when viewed from above.

Referring to FIG. 11, the force sensor includes a plurality of first electrodes 130 extending in a first extending direction and a plurality of second electrodes 230 extending in a second extending direction. In FIG. 11, the first extending direction refers to a lateral direction (e.g., from left to right), and the second extending direction refers to a longitudinal direction (e.g., from top to bottom (or upward/downward) in a plan view), such that they intersect each other.

The force sensor includes a plurality of sensing cells SR. The sensing cells SR are arranged in a matrix. In the array of sensing cells SR arranged in the matrix, the pitch of each of the row extending direction (e.g., a horizontal direction) and the column extending direction (e.g., a vertical direction) may range from 2 mm to 8 mm. In an exemplary embodiment of the present invention, the pitch of each of the horizontal direction and the vertical direction of the array of sensing cells SR may be approximately 4 mm.

Each of the sensing cells SR includes a plurality of sub-sensing regions SR1, SR2, SR3 and SR4. For example, each of the sensing cells SR may include a first sub-sensing region SR1, a second sub-sensing region SR2, a third sub-sensing region SR3, and a fourth sub-sensing region SR4. The sub-sensing regions SR1, SR2, SR3 and SR4 may be located at the intersections of the first electrodes 130 and the second electrodes 230, respectively. In each of the sensing cells SR, the sub-sensing regions SR1, SR2, SR3 and SR4 may be disposed adjacent to one another. For example, the sub-sensing regions SR1, SR2, SR3 and SR4 in a single sensing cell SR may be arranged in a two-by-two matrix.

For example, assume that the first sub-sensing region SR1 is formed at the intersection between the $m^{th}$ first electrode 130 and the $n^{th}$ second electrode 230. Then, the second sub sensing region SR2 may be formed at the intersection between the $m^{th}$ first electrode 130, which is adjacent to right side of the first sub sensing region SR1, and the $(n+1)^{th}$ second electrode 230. The third sub sensing region SR3 may be formed at the intersection between the $(m+1)^{th}$ first electrode 130, which is adjacent to the lower side of the first sub-sensing region SR1, and the $n^{th}$ second electrode 230. The fourth sub sensing region SR4 may be formed at the intersection between the $(m+1)^{th}$ first electrode 130, which is adjacent to the lower side of the second sub sensing region SR2 and adjacent to the right side of the third sub sensing region SR3, and the $(n+1)^{th}$ second electrode 230.

The sub-sensing regions SR1, SR2, SR3 and SR4 can sense shear forces in different directions. For example, the first sub-sensing region SR1 may sense a rightward shear force, the second sub-sensing region SR2 may sense a leftward shearing force, the third sub-sensing region SR3 may sense a downward shearing force, and the fourth sub-sensing regions SR4 may sense an upward shearing force. It is to be understood, however, that the present invention is not limited thereto. The direction of the shearing force sensed by each of the sub-sensing regions SR1, SR2, SR3 and SR4 may be variously modified.

The pitch of each of the row extending direction (e.g., the horizontal direction) and the column extending direction (e.g., the vertical direction) of each of the sub-sensing regions SR1, SR2, SR3 and SR4 may range from 1 mm to 4 mm. In an exemplary embodiment of the present invention in which the pitch in the horizontal and vertical directions of the array of sensing cells SR is approximately 4 mm, the pitch of each of the sub-sensing regions SR1, SR2, SR3 and SR4 may be approximately 2 mm or less (e.g., approximately 80% to 90%).

Figure 12:
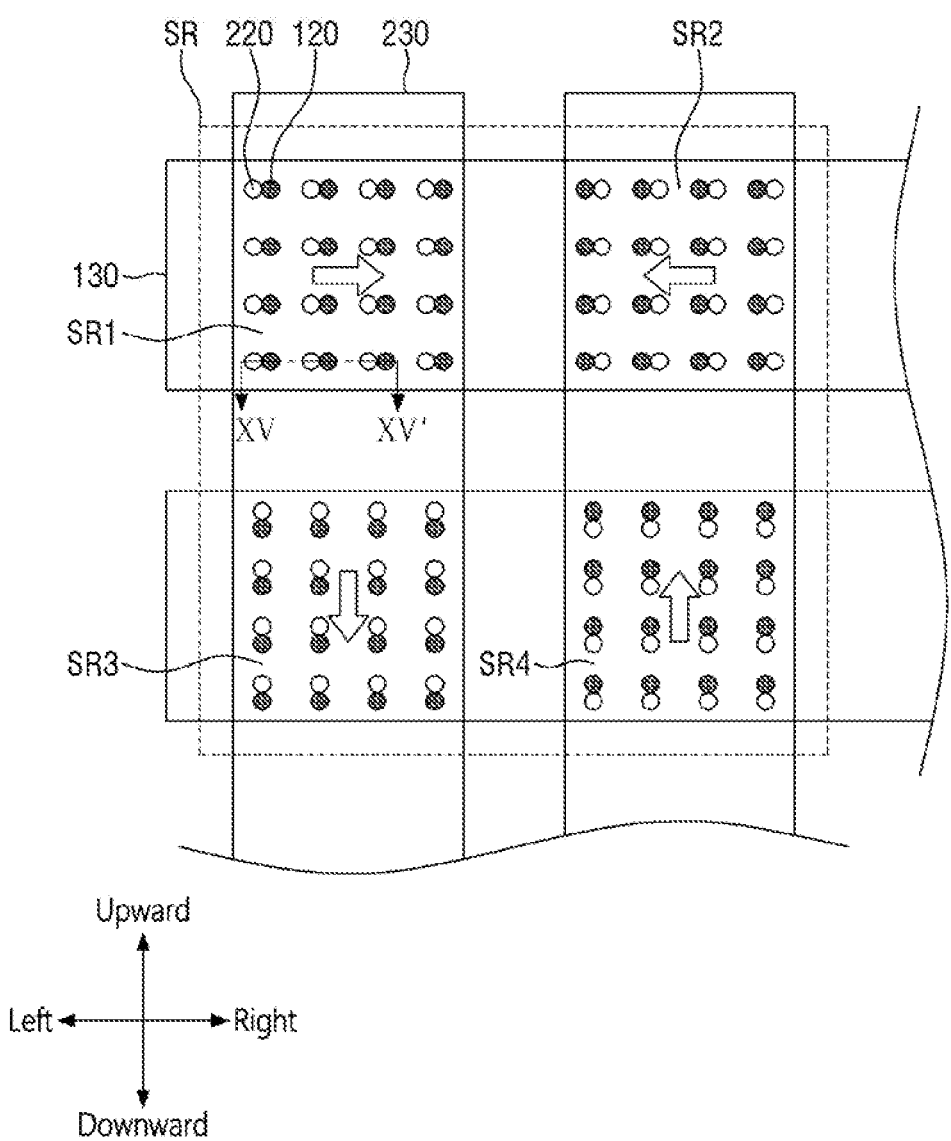
FIG. 12 is an enlarged view of one of a plurality of sensing cells of FIG. 11, according to an exemplary embodiment of the present invention.
Figure 13:
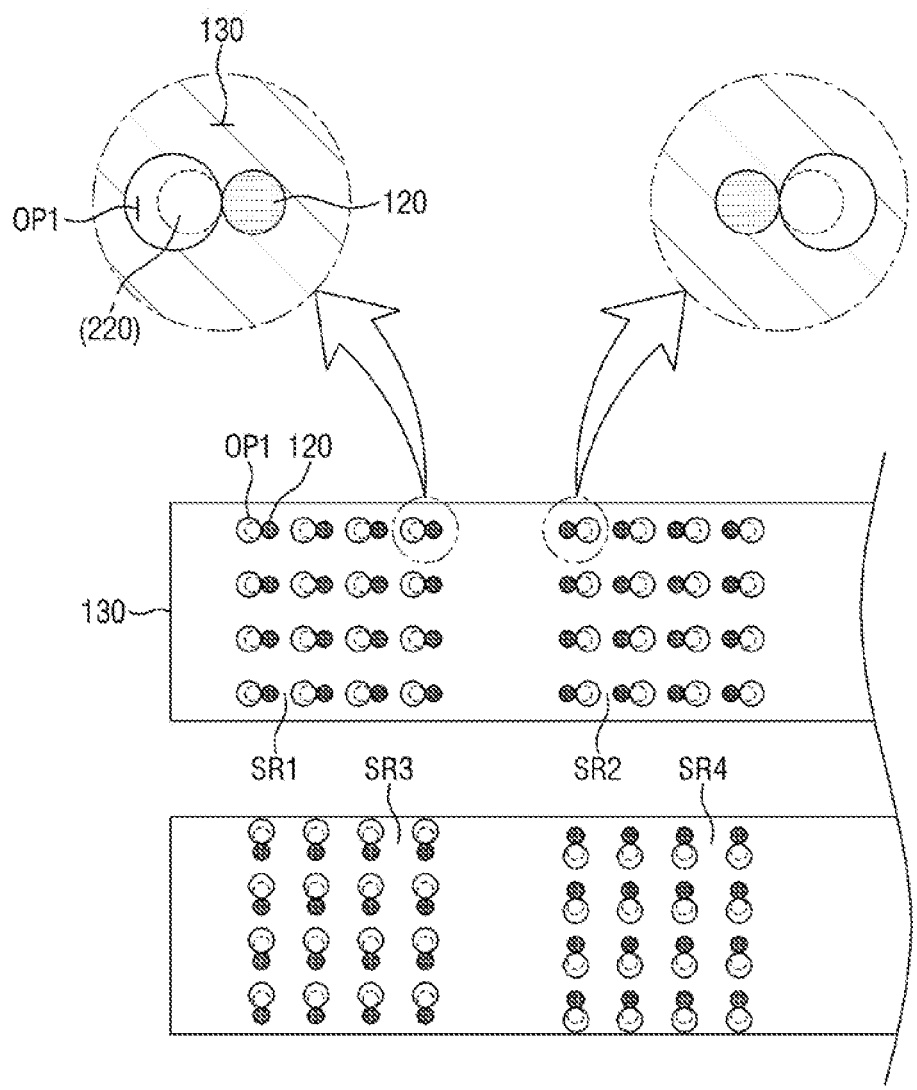
FIG. 13 is a plan view showing the layout of a first sensor element of FIG. 12, according to an exemplary embodiment of the present invention.
Figure 14:
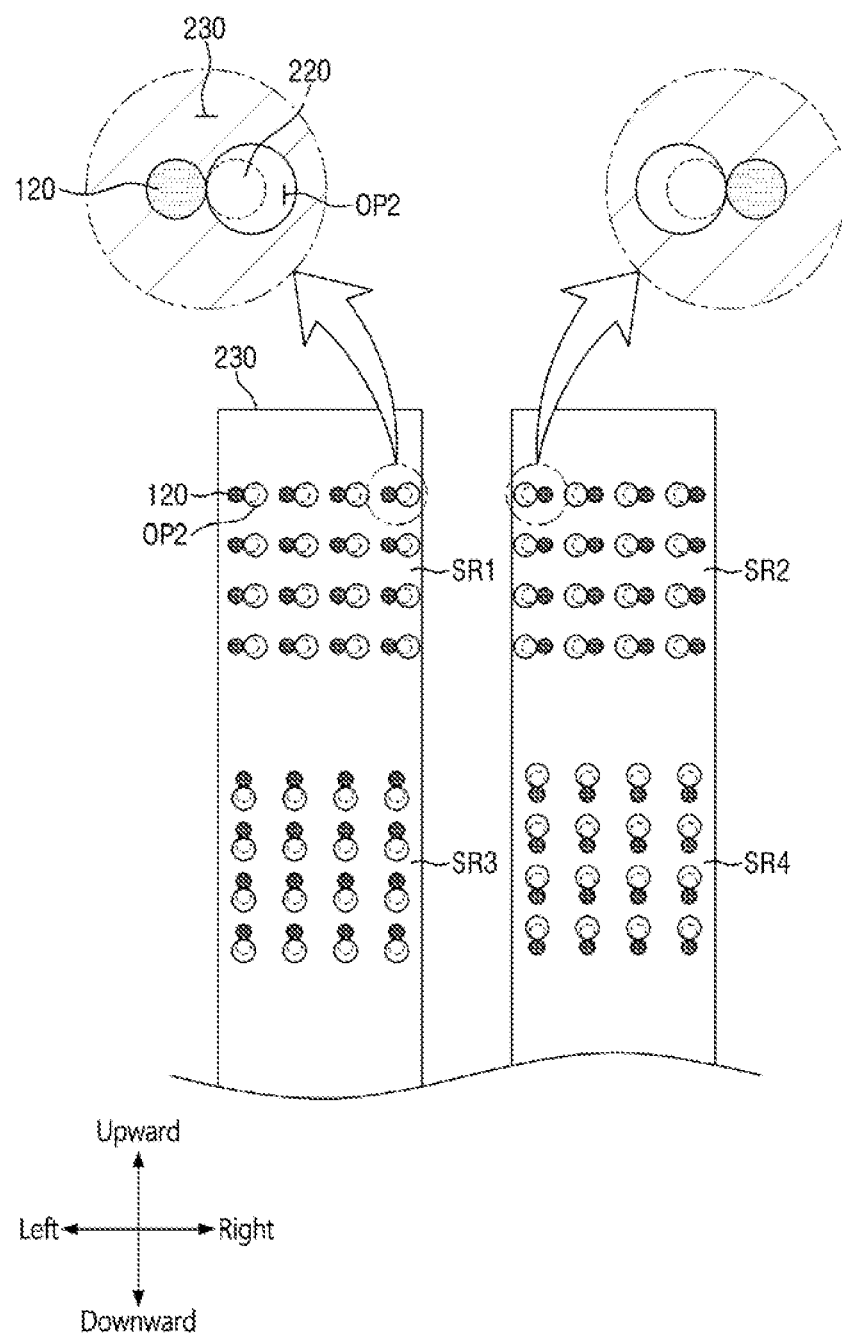
FIG. 14 is a plan view showing the layout of a second sensor element of FIG. 12, according to an exemplary embodiment of the present invention.
Figure 15:
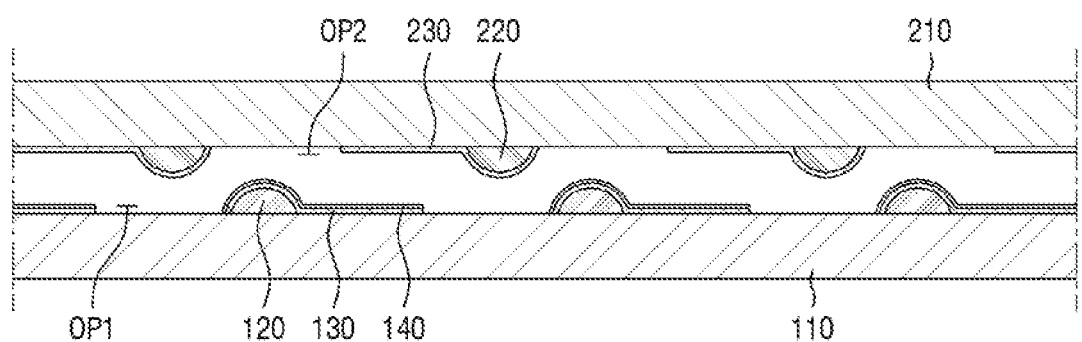
FIG. 15 is a cross-sectional view taken along line XV-XV' shown in FIG. 12, according to an exemplary embodiment of the present invention.

FIG. 12 is an enlarged view of one of the sensing cells of FIG. 11, according to an exemplary embodiment of the present invention. FIG. 13 is a plan view showing the layout of a first sensor element of FIG. 12, according to an exemplary embodiment of the present invention. FIG. 14 is a plan view showing the layout of a second sensor element of FIG. 12, according to an exemplary embodiment of the present invention. FIG. 15 is a cross-sectional view taken along line XV-XV' shown in FIG. 12, according to an exemplary embodiment of the present invention.

Referring to FIGS. 12 to 15, a first sensor element includes a first substrate 110, a first protrusion 120, a first electrode 130 and a first force sensing layer 140 stacked on the first substrate 110. A second sensor element includes a second substrate 210, a second protrusion 220 and a second electrode 230 stacked on the second substrate 210.

The first protrusion 120 and the second protrusion 220 form a pair of protrusions. In FIG. 12, the first protrusion 120 is disposed adjacent to the right side of the second protrusion 220 in the first sub-sensing region SR1, the first protrusion 120 is disposed adjacent to the left side of the second protrusion 220 in the second sub-sensing region SR2, the first protrusion 120 is disposed adjacent to the lower side of the second protrusion 220 in the third sub-sensing region SR3, and the first protrusion 120 is disposed adjacent to the upper side of the second protrusion 220 in the fourth sub-sensing region SR4.

Each of the first to fourth sub-sensing regions SR1, SR2, SR3 and SR4 may include a plurality of pairs of protrusions. Although the pairs of protrusions are arranged in a four-by-four matrix in each of the first to fourth sub-sensing regions SR1, SR2, SR3 and SR4, the numbers of the pairs of protrusions and their arrangement are not limited thereto.

The first sensor element may include a plurality of first opening areas OP1 in which each of the first electrode 130 and the first force sensing layer 140 are not disposed to thus expose the first surface of the first substrate 110. The second sensor element may include a plurality of second opening areas OP2 in which the second electrode 230 is not disposed to thus expose the first surface of the second substrate 210. Each of the first opening areas OP1 may be associated with the second protrusion 220 of the second sensor element facing it, and each of the second opening areas OP2 may be associated with the first protrusion 120 of the first sensor element facing it. When the number of the first and second protrusions 120 and 220 is sixteen, the number of the first opening areas OP1 and the number of the second opening areas OP2 may be sixteen. The shape of the first opening area OP1 and the second opening area OP2 may be, but is not limited to, a circle, an ellipse, a rectangle, a rectangle having rounded corners, and the like, when viewed from above.

In the first sub-sensing region SR1, the first opening area OP1 is formed adjacent to the left side of the first protrusion 120 to overlap with the respective second protrusion 220 (e.g., the second protrusion 220 of the pair). The first opening area OP1 formed adjacent to the left side of a particular first protrusion 120 may not overlap with another first protrusion 120 adjacent to the left side of the particular first protrusion 120. In other words, the right side surface of the first protrusion 120 may be spaced apart from that first opening area OP1.

In the second sub-sensing region SR2, the first opening area OP1 is formed adjacent to the right side of the first protrusion 120 to overlap with the respective second protrusion 220 (e.g., the second protrusion 220 of the pair). The first opening area OP1 formed adjacent to the right side of a particular first protrusion 120 may not overlap with another first protrusion 120 adjacent to the right side of the particular first protrusion 120. In other words, the left side surface of the first protrusion 120 may be spaced apart from that first opening area OP1.

In the third sub-sensing region SR3, the first opening area OP1 is formed adjacent to the upper side of the first protrusion 120 when viewed from the top to overlap with the respective second protrusion 220 (e.g., the second protrusion 220 of the pair). The first opening area OP1 formed adjacent to the upper side of a particular first protrusion 120 may not overlap with another first protrusion 120 adjacent to the upper side of the particular first protrusion 120. In other words, the lower side surface of the first protrusion 120 may be spaced apart from the first opening area OP1 formed adjacent to the upper side of the first protrusion 120.

In the fourth sub-sensing region SR4, the first opening area OP1 is formed adjacent to the lower side of the first protrusion 120 when viewed from the top to overlap with the respective second protrusion 220 (e.g., the second protrusion 220 of the pair). The first opening area OP1 formed adjacent to the lower side of a particular first protrusion 120 may not overlap with another first protrusion 120 adjacent to the lower side of the particular first protrusion 120. In other words, the upper side surface of the first protrusion 120 may be spaced apart from the first opening area OP1 formed adjacent to the lower side of the first protrusion 120.

In each of the first to fourth sub-sensing regions SR1, SR2, SR3 and SR4, the width (e.g., the width in the lateral direction) of the first opening area OP1 is equal to or greater than the width of the second protrusion 220 facing it. For example, the width of the first opening area OP1 (for example, the width in the lateral direction in the first and second sub-sensing regions SR1 and SR2, and the width in the vertical direction in the third and fourth sub-sensing regions SR3 and SR4) may be one to four times the width of the second protrusion 220 facing it. For example, and the width of the first opening area OP1 may be approximately two times the width of the second protrusion facing it.

Figure 16:
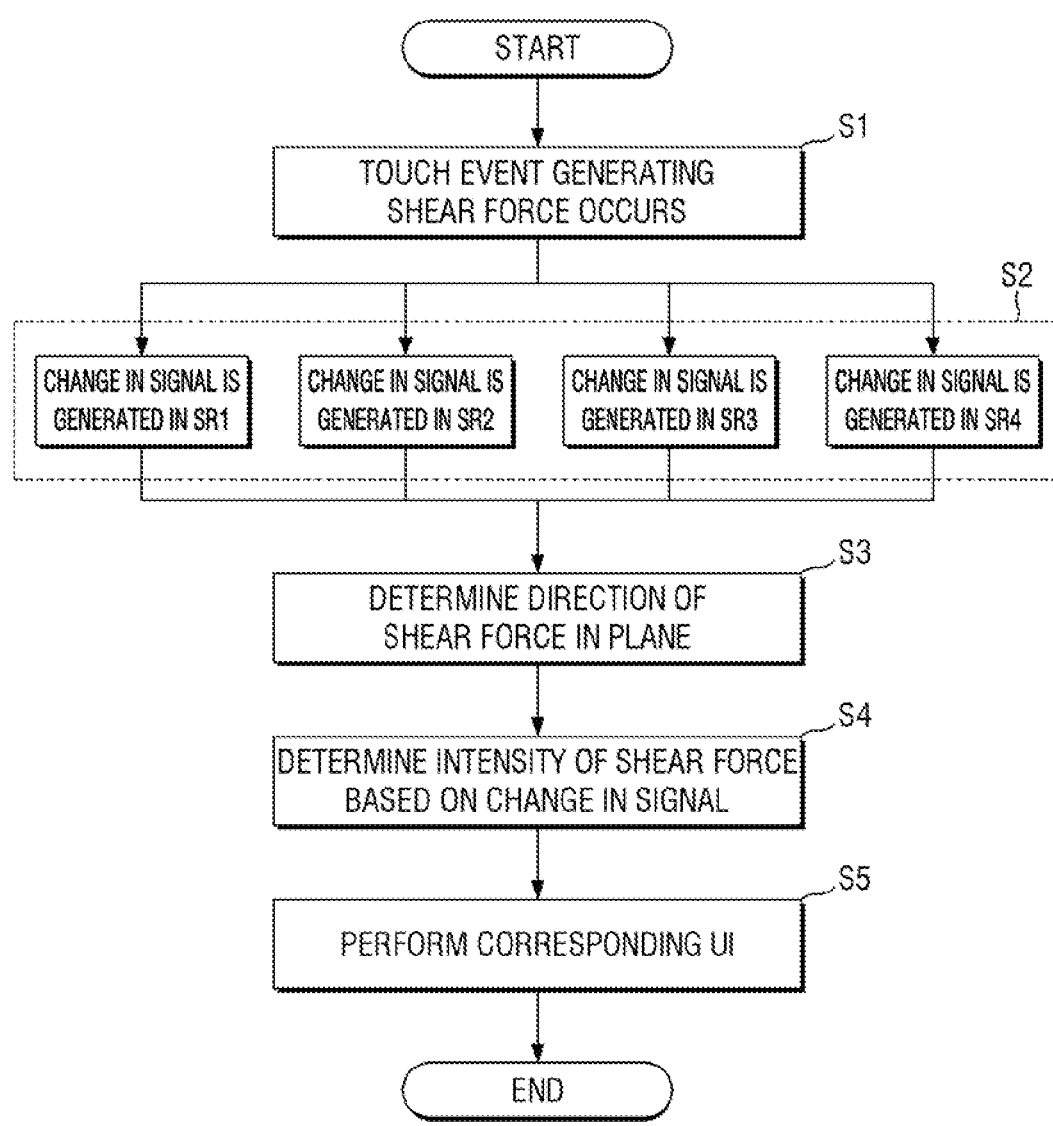
FIG. 16 is a flowchart for illustrating a method for sensing a shear force and utilizing information by a pressure sensor according to an exemplary embodiment of the present invention.

FIG. 16 is a flowchart for illustrating a method for sensing a shear force and utilizing information by a force sensor according to an exemplary embodiment of the present invention.

Referring to FIG. 16, when a touch event generating a shear force occurs (step S1), it is determined whether there is a change in signal in the first to fourth sub-sensing regions SR1, SR2, SR3 and SR4 (step S2). By doing so, it is possible to determine in which direction the shear force is generated in a plane (step S3), and the intensity of the shear force can be determined (step S4) based on the amount of the change in the signal. Once the direction and intensity of the shear force are determined, a corresponding operation may be carried out on a User Interface (UI) (step S4).

A process of determining the direction and intensity of a touch event generating a shear force will be described in detail with reference FIGS. 17 to 20.

Figure 17:
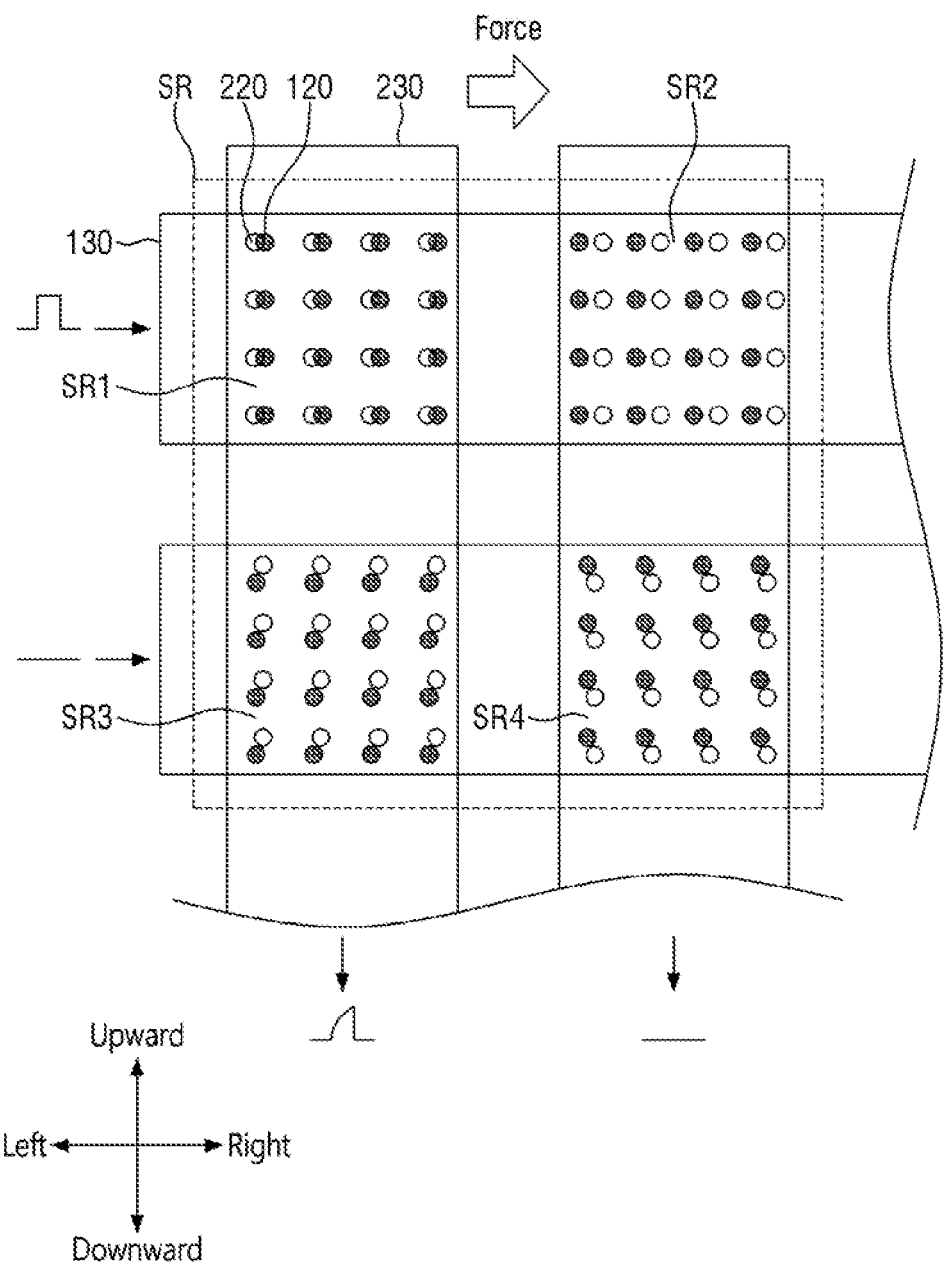
FIG. 17 is a plan view showing a method of detecting a sensing signal when a rightward shearing force is received, according to an exemplary embodiment of the present invention.
Figure 18:
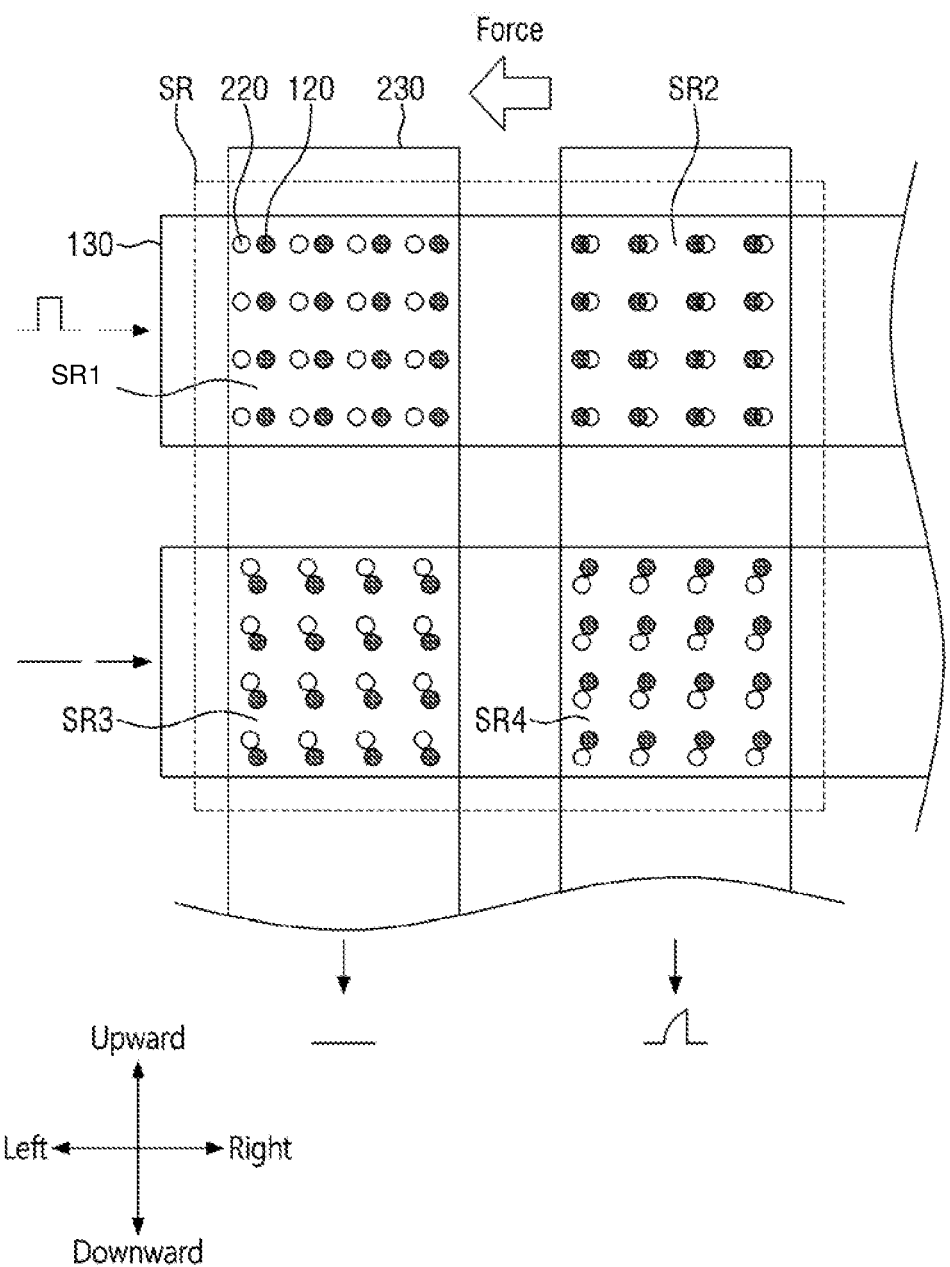
FIG. 18 is a plan view showing a method of detecting a sensing signal when a leftward shearing force is received, according to an exemplary embodiment of the present invention.
Figure 19:
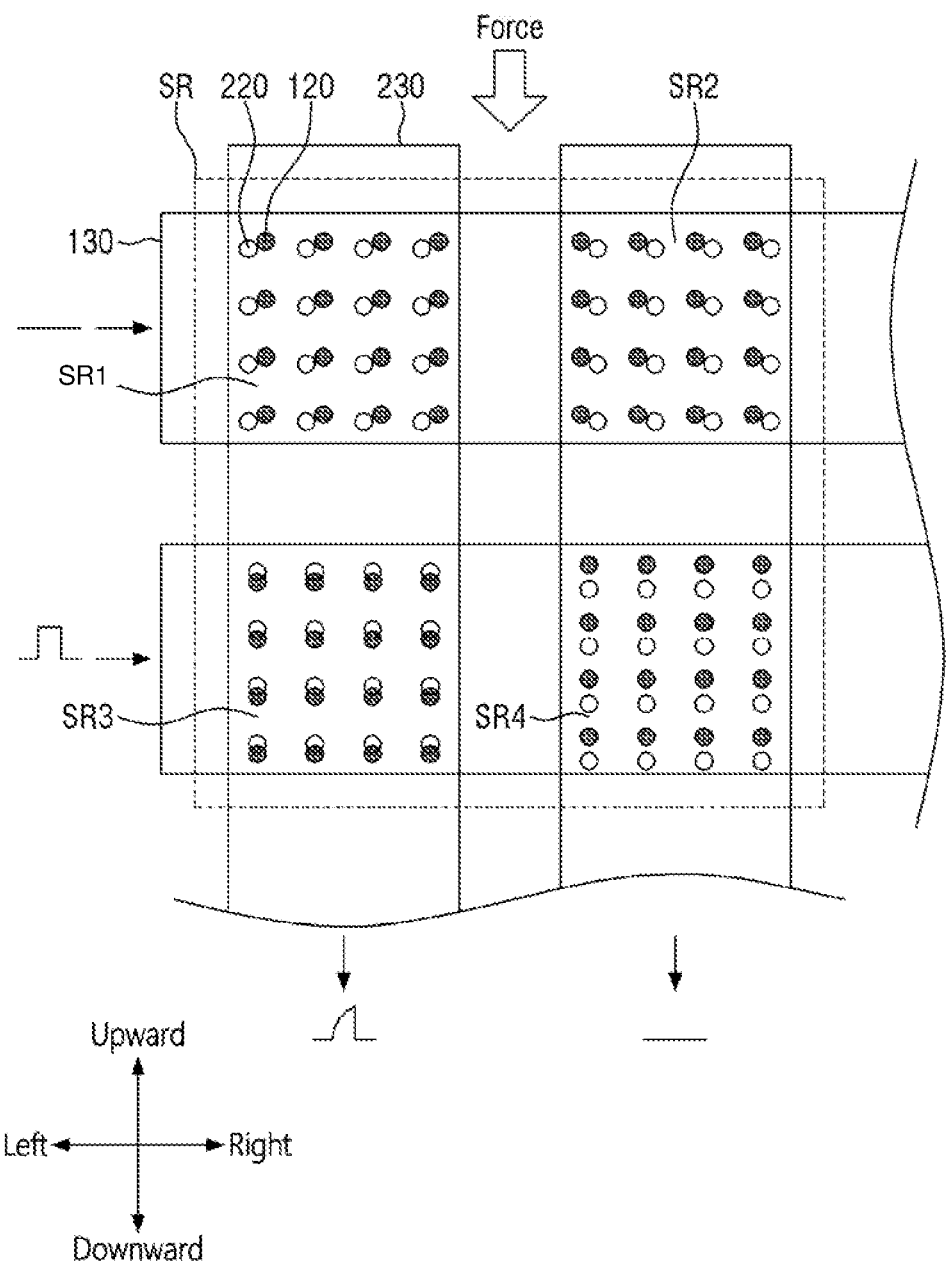
FIG. 19 is a plan view showing a method of detecting a sensing signal when a downward shearing force is received, according to an exemplary embodiment of the present invention.
Figure 20:
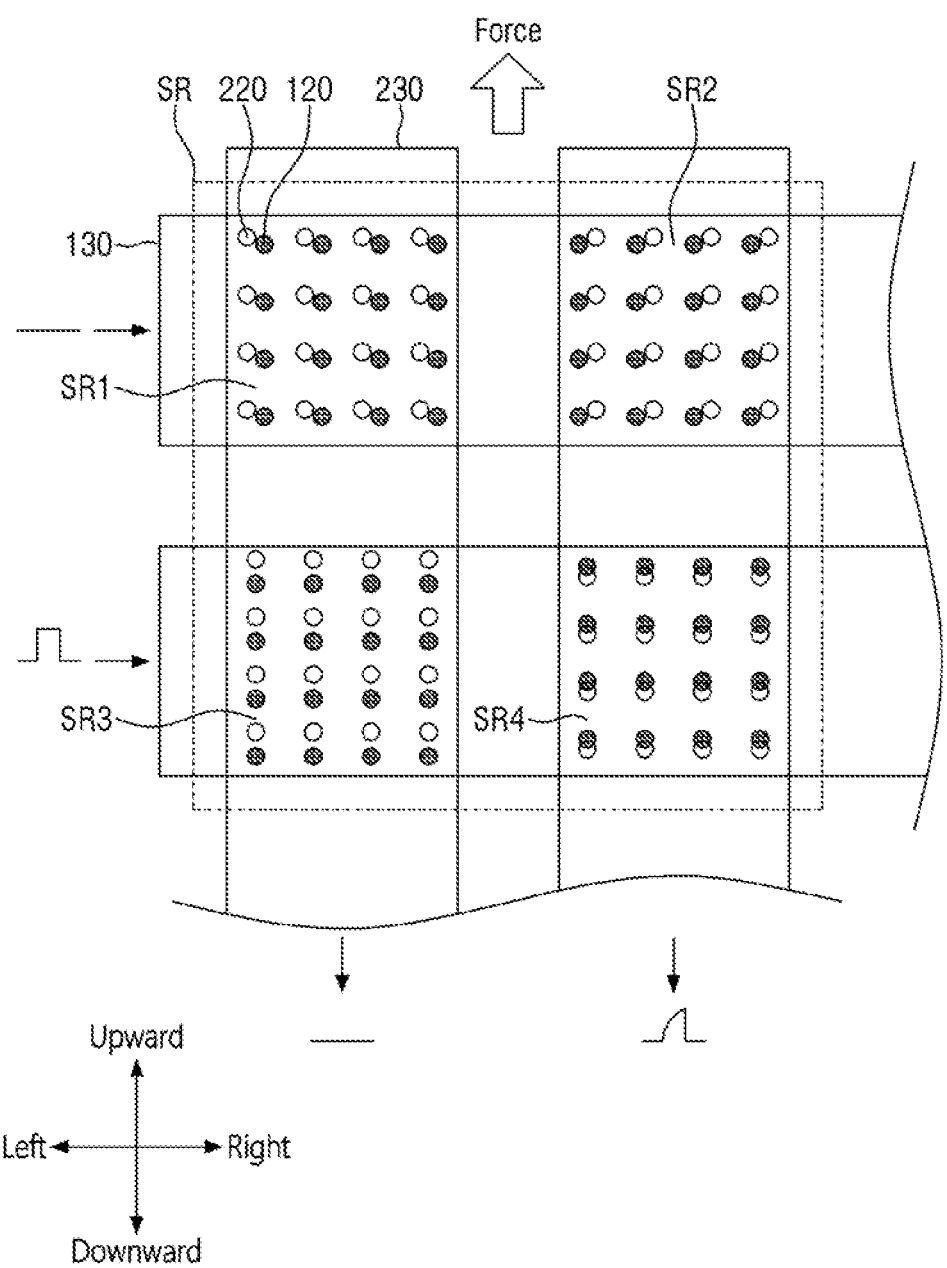
FIG. 20 is a plan view showing a method of detecting a sensing signal when an upward shearing force is received, according to an exemplary embodiment of the present invention.

FIG. 17 is a plan view showing a method of detecting a sensing signal when a rightward shearing force is received, according to an exemplary embodiment of the present invention. FIG. 18 is a plan view showing a method of detecting a sensing signal when a leftward shearing force is received, according to an exemplary embodiment of the present invention. FIG. 19 is a plan view showing a method of detecting a sensing signal when a downward shearing force is received, according to an exemplary embodiment of the present invention. FIG. 20 is a plan view showing a method of detecting a sensing signal when an upward shearing force is received, according to an exemplary embodiment of the present invention.

Initially, when a shear force is applied toward the right side as shown in the plan view of FIG. 17, the second substrate 210 is pushed to the right side, such that the relative positional relationship of the first protrusion 120 and the second protrusion 220 in each pair is changed.

In the first sub-sensing region SR1, the second protrusion 220 of each pair is moved toward the first protrusion 120, such that the second electrode 230 thereon comes into contact with the first force sensing layer 140. As a result, a force in the horizontal direction may be applied. On the other hand, in the second sub-sensing region SR2, the second protrusions 220 move away from the first protrusions 120. In the third and fourth sub-sensing regions SR3 and SR4, the position of the second protrusions 220 relative to the first protrusion 120 is changed while substantially keeping the distance therebetween in the vertical direction. As a result, the first protrusions 120 and the second protrusions 220 are not pressed.

Therefore, when a driving voltage of a certain level is applied to the first electrode 130 (e.g., the electrode in the upper row in FIG. 17) of the first sub-sensing region SR1, current flows to the second electrode 230 (e.g., the electrode in the left column in FIG. 17) of the first sub-sensing region SR1. A driving voltage of a certain level is also applied to the second sub-sensing region SR2 sharing the first electrode 130 with the first sub-sensing region SR1. However, the first electrode 130 is not electrically connected to the second electrode 230 in the second sub-sensing region SR2. Accordingly, no current flows to the second electrode 230 (e.g., the electrode in the right column in FIG. 17) of the second sub-sensing region SR2.

On the other hand, the electrode in the left column, which is the second electrode 230, is disposed across the first sub-sensing region SR1 and the third sub-sensing region SR3. In other words, the first sub-sensing region SR1 and the third sub-sensing region SR3 share the same second electrode 230. Therefore, it is useful to determine which sub-sensing region the current flowing in the electrode in the left column originates from. By applying the driving voltage of 0 V to another first electrode 130 (e.g., the electrode in the lower row in FIG. 17) which does not belong to the first sub-sensing region SR1 while applying a driving voltage of high-level to the electrode in the upper row which is the first electrode 130, it is possible to determine that the current flowing in the electrode in the left column originates from the first sub-sensing region SR1. As a result, it is possible to determine that a shearing force is generated toward the right side in the sensing cell SR. Further, it is possible to determine the magnitude of the shear force based on the amount of current flowing in the second electrode 230 (e.g., the electrode in the left column in the drawings) of the first sub-sensing region SR1.

When a shear force is applied toward the left side as shown in the plan view of FIG. 18, the second substrate 210 is pushed to the left side, such that the relative positional relationship of the first protrusion 120 and the second protrusion 220 in each pair is changed.

In the second sub-sensing region SR2, the second protrusion 220 of each pair is moved toward the first protrusion 120, such that the second electrode 230 thereon comes into contact with the first force sensing layer 140. As a result, a force in the horizontal direction may be applied. On the other hand, in the first sub-sensing region SR1, the second protrusions 220 move away from the first protrusions 120. In the third and fourth sub-sensing regions SR3 and SR4, the position of the second protrusions 220 relative to the first protrusion 120 is changed while substantially keeping the distance therebetween in the vertical direction. As a result, the first protrusions 120 and the second protrusions 220 are not pressed.

By applying the driving voltage of 0 V to another first electrode 130 (e.g., the electrode in the second row (e.g., lower row) in FIG. 18) which does not belong to the second sub-sensing region SR2 while applying a driving voltage of a certain level to the first electrode 130 of the second sub-sensing region SR2 (e.g., the electrode in the first row (e.g., upper row) in FIG. 18), a current may flow to the second electrode 230 (the electrode in the second column (e.g., right column) in FIG. 18) of the second sub-sensing region SR2. In this case, it is possible to determine that the shear force is generated toward the left side in the sensing cell SR based on the current. In addition, the magnitude of the shear force can be determined based on the amount of current.

When a shear force is applied toward the lower side as shown in the plan view of FIG. 19, the second substrate 210 is pushed to the lower side, such that the relative positional relationship of the first protrusion 120 and the second protrusion 220 in each pair is changed.

In the third sub-sensing region SR3, the second protrusion 220 of each pair is moved toward the first protrusion 120, such that the second electrode 230 thereon comes into contact with the first force sensing layer 140. As a result, a force in the horizontal direction may be applied. On the other hand, in the fourth sub-sensing region SR4, the second protrusions 220 move away from the first protrusions 120. In the first and second sub-sensing regions SR1 and SR2, the position of the second protrusions 220 relative to the first protrusions 120 is changed while substantially keeping the distance therebetween in the horizontal direction. As a result, the first protrusions 120 and the second protrusions 220 are not pressed.

By applying the driving voltage of 0 V to another first electrode 130 (e.g., the electrode in the first row (e.g., upper row) in FIG. 19) which does not belong to the second sub-sensing region SR2 while applying a driving voltage of a certain level to the first electrode 130 of the third sub-sensing region SR3 (e.g., the electrode in the second row (e.g., lower row) in FIG. 19), a current may flow to the second electrode 230 (e.g., the electrode in the first column (e.g., left column) in FIG. 19) of the third sub-sensing region SR3. Therefore, it is possible to determine that the shear force is generated toward the lower side in the sensing cell SR based on the current. In addition, the magnitude of the shear force can be determined based on the amount of current.

When a shear force is applied toward the upper side as shown in the plan view of FIG. 20, the second substrate 210 is pushed to the lower side, such that the relative positional relationship of the first protrusion 120 and the second protrusion 220 in each pair is changed.

In the fourth sub-sensing region SR4, the second protrusion 220 of each pair is moved toward the first protrusion 120, such that the second electrode 230 thereon comes into contact with the first force sensing layer 140. As a result, a force in the horizontal direction may be applied. On the other hand, in the third sub-sensing region SR3, the second protrusions 220 move away from the first protrusions 120. In the first and second sub-sensing regions SR1 and SR2, the position of the second protrusions 220 relative to the first protrusions 120 is changed while substantially keeping the distance therebetween in the horizontal direction. As a result, the first protrusions 120 and the second protrusions 220 are not pressed.

By applying the driving voltage of 0 V to another first electrode 130 (e.g., the electrode in the first row (e.g., upper row) in FIG. 20) which does not belong to the fourth sub-sensing region SR4 while applying a driving voltage of a certain level to the first electrode 130 of the fourth sub-sensing region SR4 (e.g., the electrode in the second row (e.g., lower row) in FIG. 20), a current may flow to the second electrode 230 (e.g., the electrode in the second column (e.g., lower column) in FIG. 20) of the fourth sub-sensing region SR4. Therefore, it is possible to determine that the shear force is generated toward the upper side in the sensing cell SR based on the current. In addition, the magnitude of the shear force can be determined based on the amount of current.

The shear force input to the force sensor may have a direction other than the upward, downward, leftward, and rightward. In this case, the sensing currents may be detected in two or more sub-sensing regions. For example, when a right-upward shear force is applied to the force sensor, the shear force may be divided into the rightward shear force component and the upward shear force component. Therefore, a sensing current may be detected from each of the first sub-sensing region SR1 by sensing the rightward shear force and the fourth sensing region SR4 by sensing the upward shearing force. By expressing the shear force detected from each of the sub-sensing regions as vectors and adding up these vectors, the direction and magnitude of the actual shear force can be calculated. In this way, the shear force in 360° and its magnitude can be measured from the sub-sensing regions SR1, SR2, SR3 and SR4 by sensing the shear force in four directions.

Figure 21:
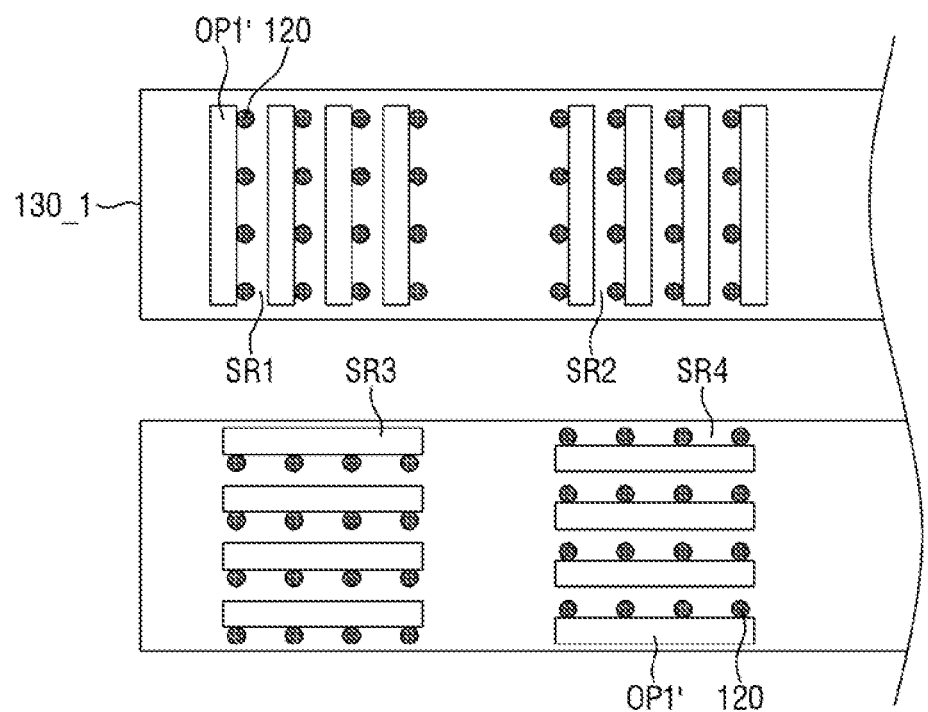
FIG. 21 is a plan view showing the layout of a first sensor element of a force sensor according to another exemplary embodiment of the present invention.

FIG. 21 is a plan view showing the layout of a first sensor element of a force sensor according to another exemplary embodiment of the present invention. The exemplary embodiment of FIG. 21 illustrates that the first opening areas OP1 associated with two or more protrusion pairs can be connected to each other.

Referring to FIG. 21, in the first and second sub-sensing regions SR1 and SR2 of the first sensor element, a single first opening area OP1' is formed adjacent to a plurality of first protrusions 120 adjacent to each other in the vertical direction (e.g., first protrusions 120 belonging to the same column). In the third and fourth sub-sensing regions SR3 and SR4, a single first opening area OP1' is formed adjacent to a plurality of first protrusions 120 adjacent to each other in the horizontal direction (e.g., first protrusions 120 belonging to the same row). The first opening area OP1' may have a shape extending in the vertical direction or the horizontal direction. Although not shown in FIG. 21, for the second sensor element, the second opening areas OP2 associated with two or more protrusion pairs may be connected to each other in the same manner as the first opening areas OP1'.

According to this exemplary embodiment, although the single first opening OP1' is extended in one direction to be formed adjacent to the plurality of protrusions 120, the first electrodes 130 are not disconnected by the first opening areas OP1' but instead are connected to one another. Therefore, it is possible to detect a shear force in substantially the same manner as described in reference to FIG. 11.

Figure 22:
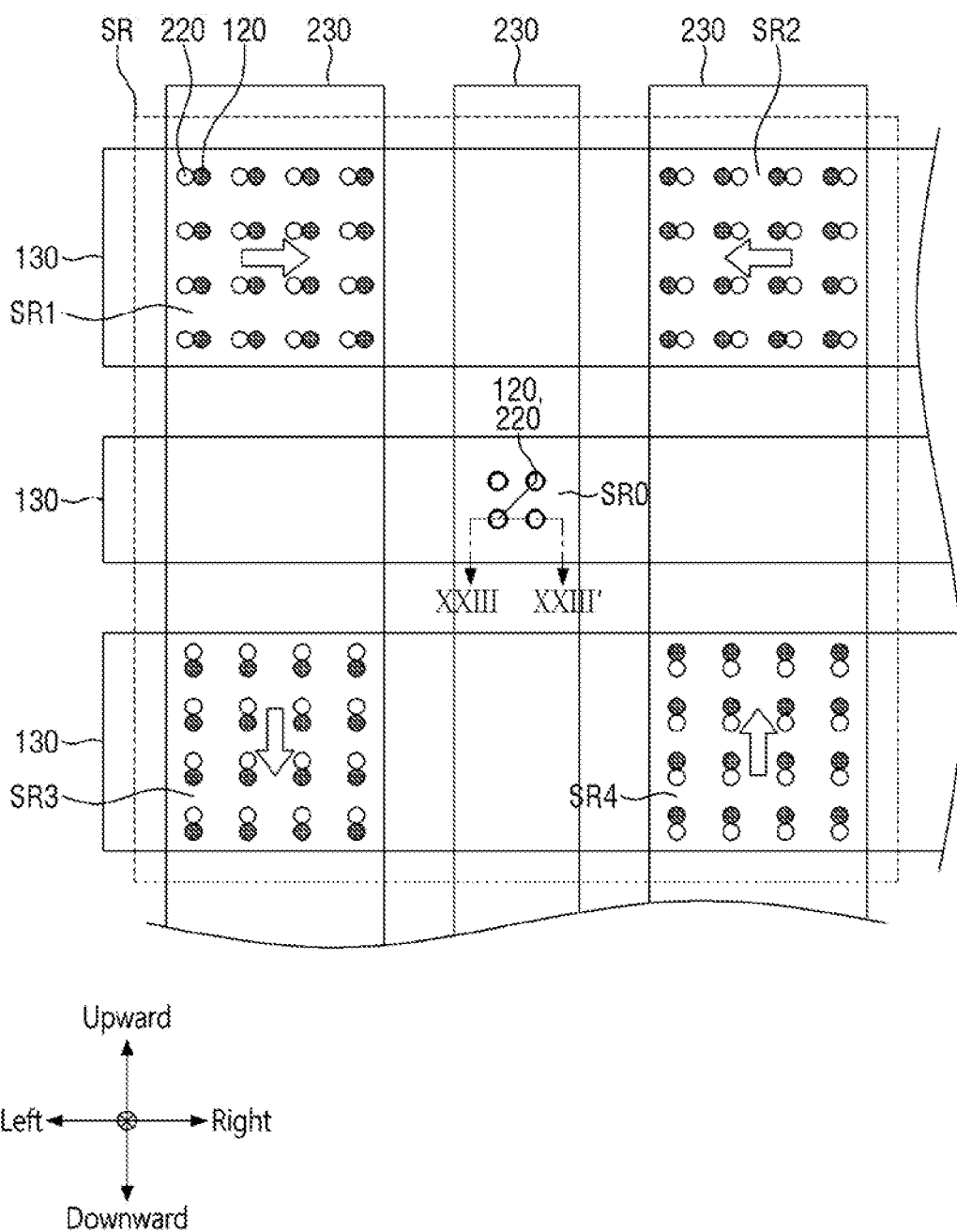
FIG. 22 is a plan view showing the layout of a force sensor according to yet another exemplary embodiment of the present invention.

FIG. 22 is a plan view showing the layout of a force sensor according to yet another exemplary embodiment of the present invention. FIG. 23 is a cross-sectional view taken along line XXIII-XXIII' of FIG. 22, according to an exemplary embodiment of the present invention. The embodiment shown in FIGS. 22 and 23 differs from the embodiment shown in FIG. 11 in that FIGS. 22 and 23 further include a pressure sensing region for sensing a pressure in the thickness direction.

Referring to FIG. 22, an additional first electrode 130 may be disposed between the first electrode 130 of the first and second sub-sensing regions SR1 and SR2, and the first electrode 130 of the third and fourth sub-sensing regions SR3 and SR4 of the force sensor. In addition, an additional second electrode 230 may be disposed between the second electrode 230 of the first and third sub-sensing regions SR1 and SR3, and the second electrode 230 of the second and fourth sub-sensing regions SR2 and SR4 of the force sensor. A pressure sensing region SR0 may be located at the intersection of the additional first electrode 130 and the additional second electrode 230. In other words, the sensing cell SR may further include the pressure sensing region SR0, in addition to the first to fourth sub-sensing regions SR1, SR2, SR3, and SR4. The width of the first and second electrodes 130 and 230 forming the pressure sensing region SR0 may be smaller than the width of the first electrode 130 and the second electrode 230 forming the sub-sensing regions SR1, SR2, SR3 and SR4. However, the present invention is not limited thereto.

Referring to FIGS. 22 and 23, in the pressure sensing region SR0, the first sensor element may include a plurality of first protrusions 120, and the second sensor element may include a plurality of second protrusions 220. The first protrusions 120 may face the second protrusions 220 such that the centers of the first protrusions 120 are aligned with the centers of the second protrusions 220 in the pressure sensing region SR0, unlike the other sub-sensing regions SR1, SR2, SR3 and SR4. It is to be understood, however, that the present invention is not limited thereto. For example, the first protrusion 120 and the second protrusion 220 may overlap with each other in the thickness direction.

In the pressure sensing region SR0, a first sensor element and a second sensor element may not include an opening area. In other words, similarly to the exemplary embodiment shown in FIG. 6, the first electrode 130 and the first force sensing layer 140 are disposed to cover the entire area of the first surface of the first substrate 110, and the second electrode 230 may cover the entire area on the first surface of the second substrate 210.

When the force sensor receives a force in the second thickness direction Z2, the second protrusion 220 approaches the first protrusion 120, such that the first electrode 130, the first force sensing layer 140, the second electrode 230 can come into contact one another. Accordingly, the sensing current can be sensed in the pressure sensing region SR0, such that it is possible to determine whether there is a force in the thickness direction and to sense the magnitude thereof, if such force exists.

Figure 24:
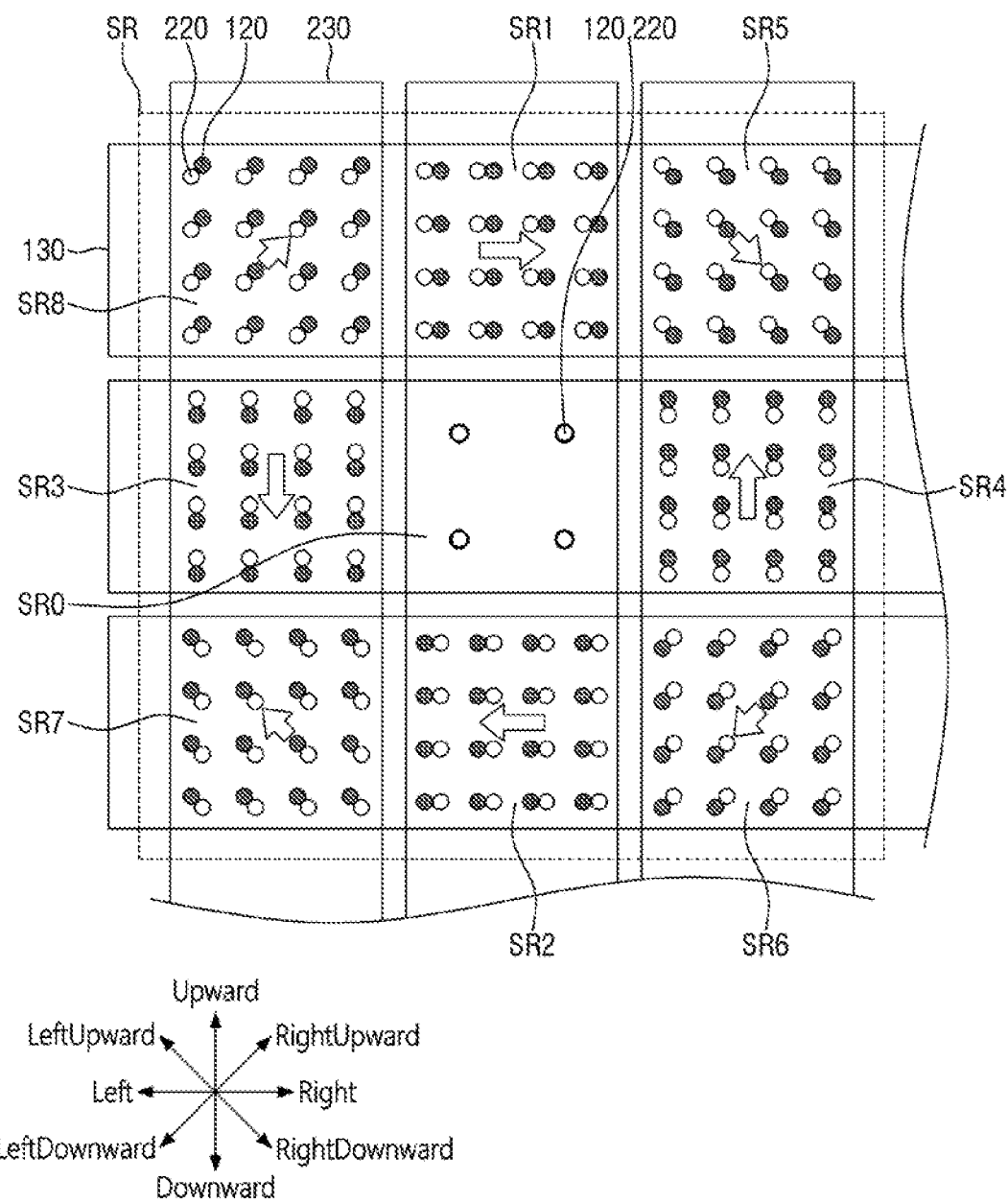
FIG. 24 is a plan view showing the layout of a force sensor according to yet another exemplary embodiment of the present invention.

FIG. 24 is a plan view showing the layout of a force sensor according to yet another exemplary embodiment of the present invention. The exemplary embodiment shown in FIG. 24 illustrates that a force sensor may include sub-sensing regions for detecting a shearing force in directions other than the upward, downward, leftward, and rightward directions.

A force sensor according to the exemplary embodiment shown in FIG. 24 is substantially identical to the exemplary embodiment shown in FIG. 22 except that a sensing cell SR includes a pressure sensing region SR0 and eight sub-sensing regions SR1, SR2, SR3, SR4, SR5, SR6, SR7 and SR8. The pressure sensing region SR0 and the eight sub-sensing regions SR1 to SR8 may be arranged in a three-by-three matrix.

In a single sensing cell SR, three first electrodes 130 and three second electrodes 230 may be disposed. The sub-sensing regions SR1 to SR8 and the pressure sensing regions SR0 are arranged at the intersections of the first electrodes 130 and the second electrodes 230.

According to an exemplary embodiment of the present invention, the first sub-sensing region SR1 is configured to sense a rightward shear force and may be formed at the intersection of the first electrode 130 in the first row (e.g., upper row) and the second electrode 230 in the second column (e.g., middle column). The second sub-sensing region SR2 is configured to sense a leftward shear force and may be formed at the intersection of the first electrode 130 in the third row (e.g., lower row) and the second electrode 230 in the second column (e.g., middle column). The third sub-sensing region SR3 is configured to sense a downward shear force and may be formed at the intersection of the first electrode 130 in the second row (e.g., middle row) and the second electrode 230 in the first column (e.g., left column). The fourth sub-sensing region SR4 is configured to sense an upward shear force and may be formed at the intersection of the first electrode 130 in the second row (e.g., middle row) and the second electrode 230 in the third column (e.g., right column). The fifth sub-sensing region SR5 is configured to sense a right-downward shear force (at an angle of 45° between the rightward and the downward forces, for example) and may be formed at the intersection of the first electrode 130 in the first row and the second electrode 230 in the third column. The sixth sub-sensing region SR6 is configured to sense a left-downward shear force and may be formed at the intersection of the first electrode 130 in the third row and the second electrode 230 in the third column. The seventh sub-sensing region SR7 is configured to sense a left-upward shear force and may be formed at the intersection of the first electrode 130 in the third row and the second electrode 230 in the first column. The eighth sub-sensing region SR8 is configured to sense a right-upward shear force and may be formed at the intersection of the first electrode 130 in the first row and the second electrode 230 in the first column. The pressure sensing region SR0 is configured to sense a force in the thickness direction and may be formed at the intersection of the first electrode 130 in the second row and the second electrode 230 in the second column.

In the sub-sensing regions SR1 to SR8, the first protrusions 120 are positioned closer to the direction of the shearing force to be detected than the respective second protrusions 220. For example, in the fifth sub-sensing region SR5 for sensing the right-downward shear force, the first protrusions 120 are disposed adjacent to the lower right side of the respective second protrusions 220.

In the pressure sensing region SR0, the first protrusion 120 and the second protrusion 220 of each pair may overlap each other, and the number of the pairs, e.g., four, may be less than the number of the pairs in the sub-sensing regions, e.g., 16. It is to be understood, however, that the present invention is not limited thereto.

According to the present embodiment, the force sensor further includes the sub-sensing regions for detecting right-upward, right-downward, left-upward and left-downward shearing forces as well as than the upward, downward, leftward, and rightward shear forces, so that it is possible to more precisely detect the directions of the shear forces.

Figure 25:
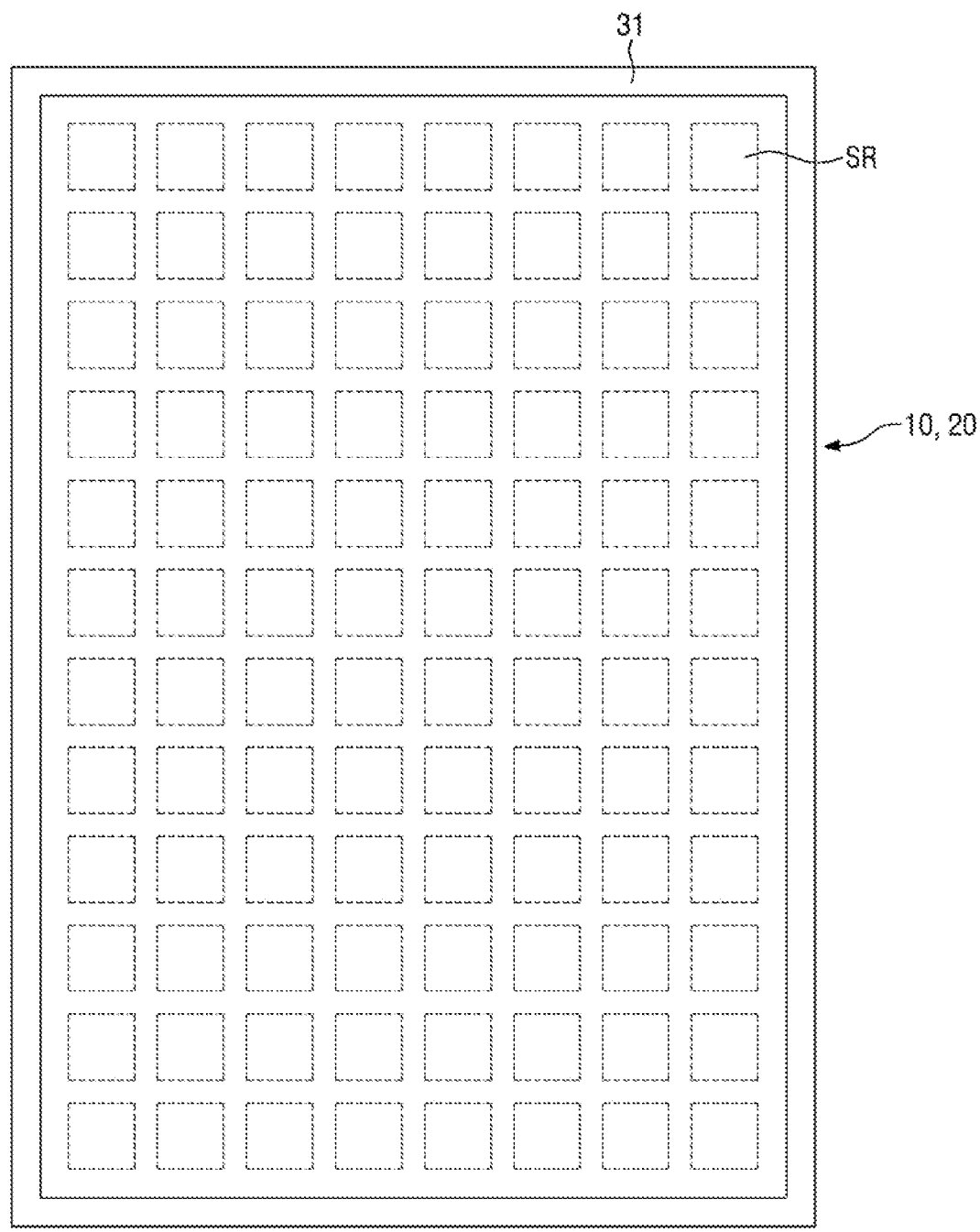
FIGS. 25, 26 and 27 are plan views showing the layouts of a force sensor according to a variety of exemplary embodiments of the present invention.
Figure 26:
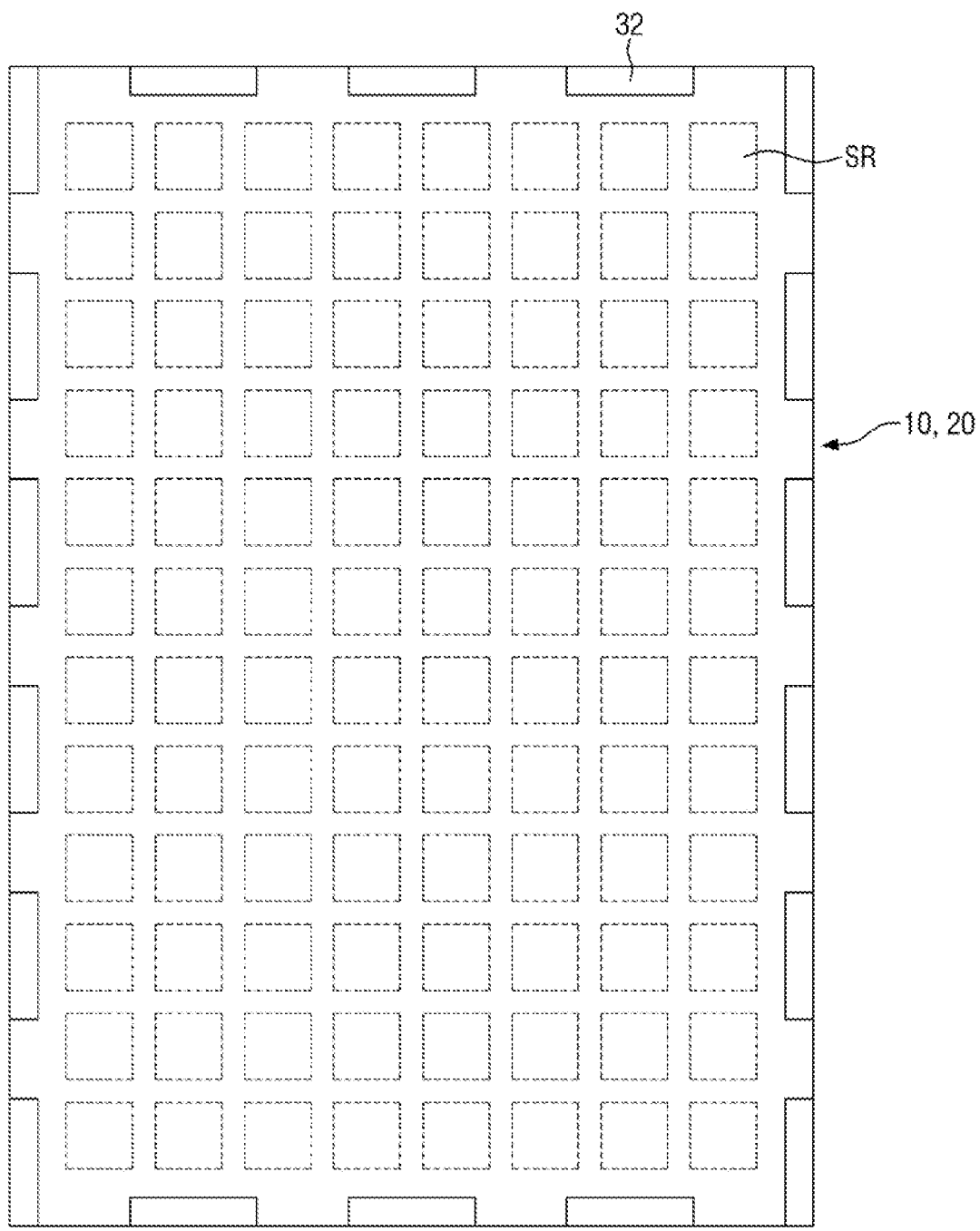
Figure 27:
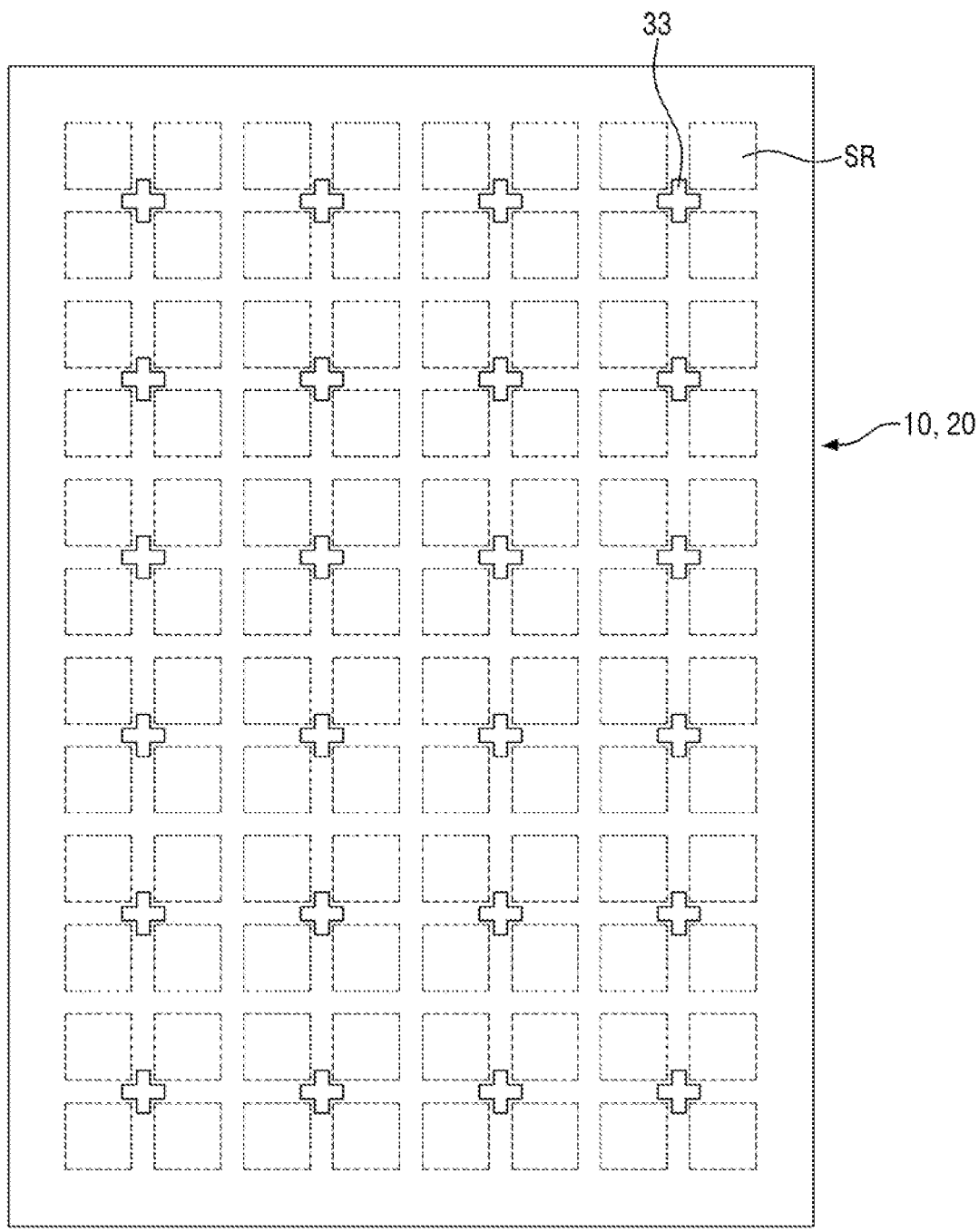

Hereinafter, a variety of shapes and layouts of a supporter of a force sensor will be described. FIGS. 25 to 27 are plan views showing the layouts of a force sensor according to a variety of exemplary embodiments of the present invention.

Referring to FIG. 25, a first sensor element 10 and a second sensor element 20 overlap with each other in the thickness direction and are coupled with each other by a supporter 31. The supporter 31 of the force sensor may be disposed along the edge of the first sensor element 10 and the second sensor element 20. The force sensor may include an array of sensing cells SR arranged in a matrix, and the supporter 31 may surround the array of sensing cells SR. The supporter 31 may not overlap with the sensing cells SR. The supporter 31 may be disposed in the form of a continuous line and may have a closed curve shape when viewed from the top, e.g., above.

The embodiment shown in FIG. 26 differs from the embodiment shown in FIG. 25 in that a supporter 32 of a force sensor is disposed in the form of an intermittent line. As shown in FIG. 26, the supporter 32 is disposed along the edge of a first sensor element 10 and a second sensor element 20, and may have a stitch shape (or a broken shape) of separated islands.

According to the exemplary embodiment shown in FIG. 27, the supporters 33 of the force sensor may be disposed inside the array of the sensing cells SR. As shown in FIG. 27, a plurality of the supporters 33 may be disposed along the boundaries of the plurality of sensing cells SR. The supporters 33 are separated from one another and spaced apart from one another by a regular spacing. For example, each of the supporters 33 may be disposed for every sensing cell SR or for several sensing cells SR. The supporters 33 may have a cross shape. The horizontal length of the supporters 33 may be equal to the vertical length of the supporters 33, and the lengths of the supporters 33 may be smaller than the width of the sensing cells SR. It is to be understood, however, that the present invention is not limited thereto. For example, the supporters 33 may have various island-like shapes other than the cross shape.

Although not shown in FIG. 27, the supporters 33 may also be disposed between sub-sensing regions (see SR1, SR2, SR3 and SR4 in FIG. 11). The exemplary embodiment shown in FIG. 27 may be combined with the embodiment of FIG. 25 or 26. In other words, supporters (31, 32 or 33) may be disposed on the edge of the first sensor element 10 and the second sensor element 20 and as well as inside the array of sensing cells SR.

The force sensor as described above may be applied to various electronic devices including display devices.

Figure 28:
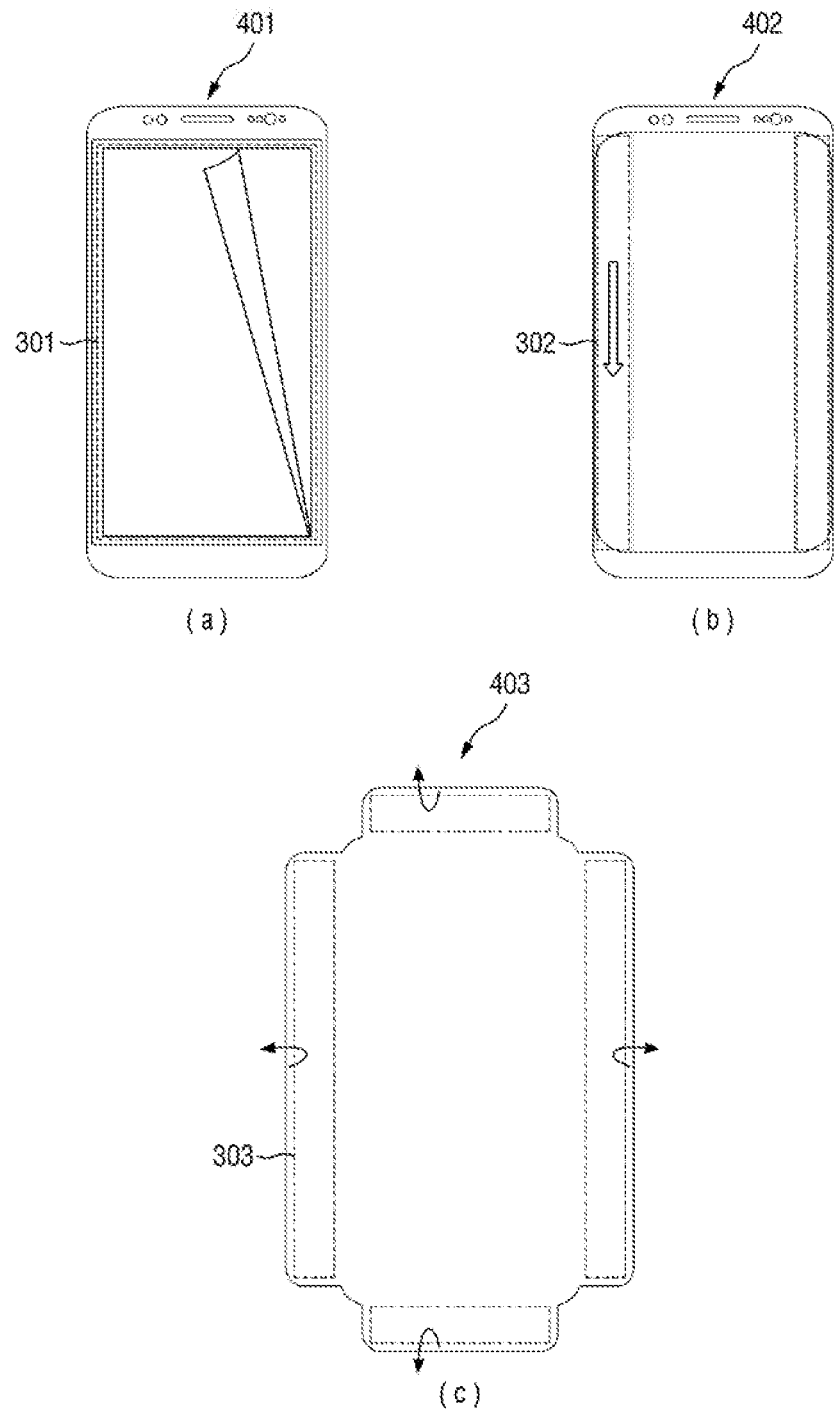

FIGS. 28 and 29 are views of electronic devices including force sensors according to exemplary embodiments of the present invention.

FIG. 28(a) illustrates an example where a force sensor 301 overlaps with the display screen of a smartphone 401. The force sensor 301 recognizes a shearing force, so that a variety of applications can be achieved, e.g., the display device may display an image that a paper is turned over.

FIG. 28(b) illustrates an example where a force sensor 302 is disposed at either side of the longer edge of a smartphone 402. The force sensor 302 disposed at the both longer sides may be used for receiving a touch input or in place of physical buttons.

FIG. 28(c) illustrates an example where a force sensor 303 is disposed at side displays of a multifaceted display device 403.

FIG. 29(a) illustrates an example where a force sensor 304 is disposed on the side portion of a smart watch 404 to be utilized as an input device.

FIG. 29(b) illustrates an example where a force sensor 305 is disposed at the center of glasses in a head-mounted display device 405 to serve as a control key of the head-mounted display device 405.

FIG. 29(c) illustrates an example where a force sensor 306 is disposed at least on a part of the display screen of a game console or a smartphone 406 to be used in place of control buttons of a joystick.

FIG. 29(d) illustrates an example where a force sensor 307 is included in a display device of a navigation device or a center panel inside a vehicle 407. For example, the force sensor 307 may be used as an input means for various devices such as an air conditioner and an audio device, which are located in the center panel of the vehicle 407.

The applications of the force sensor are not limited to those shown in the drawings, and the force sensor may be applicable to various types of input means for other electronic devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A force sensor, comprising:
    a first surface and a second surface facing each other in a first direction;
    a first protrusion protruded from the first surface toward the second surface;
    a first electrode on the first protrusion;
    a first force sensing layer on the first electrode;
    a second protrusion protruded from the second surface toward the first surface; and
    a second electrode on the second protrusion,
    wherein the first protrusion and the second protrusion are not overlapped with each other or are partially overlapped with each other,
    wherein a center of the first protrusion is spaced apart from a center of the second protrusion in a second direction perpendicular to the first direction, and
    wherein the center of the first protrusion overlaps a portion of the second surface not covered by the second electrode.

2. The force sensor of claim 1, wherein a space between the center of the first protrusion and the center of the second protrusion in the second direction is smaller than a sum of a width of the first protrusion and a width of the second protrusion.

3. The force sensor of claim 2, wherein each of the first protrusion and the second protrusion comprises a first side and a second side opposite to the first side along the second direction, and
    wherein the second side of the first protrusion does not overlap with the second protrusion in the first direction.

4. The force sensor of claim 3, wherein the second side of the first protrusion is spaced apart from the first side of the second protrusion in the second direction.

5. The force sensor of claim 2, wherein each of the first protrusion and the second protrusion comprises a first side and a second side opposite to the first side along the second direction, and
    wherein the second side of the first protrusion overlaps with the second protrusion in the first direction.

6. The force sensor of claim 1, further comprising:
    a first opening on the first surface, wherein the first electrode and the first force sensing layer are not disposed in the first opening; and
    a second opening on the second surface, wherein the second electrode is not disposed in the second opening,
    wherein the center of the second protrusion overlaps with the first opening, and the center of the first protrusion overlaps with the second opening.

7. The force sensor of claim 6, wherein the first protrusion is spaced apart from the second surface and the second protrusion is spaced apart from the first surface when the force sensor is not pressed.

8. The force sensor of claim 7, wherein the first protrusion comes in contact with the second surface and the second protrusion comes in contact with the first surface when the force sensor is pressed in the first direction.

9. The force sensor of claim 1, wherein the first force sensing layer on the first protrusion comes in contact with the second electrode on the second protrusion in response to an externally applied force.

10. The force, sensor of claim 1, wherein the first force sensing layer includes a pressure sensitive material with a resistance that varies depending on a pressure applied thereto.

11. The force sensor of claim 1, further comprising: a second force sensing layer on the second electrode.

12. The force sensor of claim 1, wherein each of the first protrusion and the second protrusion has a dome shape.

13. The force sensor of claim 1, further comprising:
    an insulating layer on the first force sensing layer,
    wherein the first electrode and the first force sensing layer extend to an area facing the second protrusion, and wherein the insulating layer covers the first force sensing layer in the area facing the second protrusion.

14. The force sensor of claim 1, further comprising:
an insulating layer on the second electrode,
wherein the second electrode extends to an area facing the first protrusion, and
wherein the insulating layer covers a part of the second electrode on the area facing the first protrusion.

15. The force sensor of claim 1, further comprising:
an insulating pattern disposed on the first force sensing layer,
wherein the insulating pattern overlaps with the center of the first protrusion and does not overlap with a side portion of the first protrusion.

16. The force sensor of claim 1, further comprising:
an insulating pattern disposed on the second electrode,
wherein the insulating pattern overlaps with the center of the second protrusion and does not overlap with a side portion of the second protrusion.

17. A force sensor, comprising:
a first sensor element comprising a first substrate, a first protrusion disposed on the first substrate, a first electrode on the first protrusion, and a first force sensing layer on the first electrode;
a second sensor element comprising a second substrate, a second protrusion disposed on the second substrate, and a second electrode disposed on the second protrusion;
a first opening on the first substrate, wherein at least one of the first electrode and the first force sensing layer is not disposed in the first opening, and
a second opening on the second substrate, wherein the second electrode is not disposed in the second opening,
wherein a center of the first protrusion is spaced apart from a center of the second protrusion in a first direction,
wherein the center of the second protrusion overlaps with the first opening, and the center of the first protrusion overlaps with the second opening,
wherein the first force sensing layer faces the second substrate, and
wherein the first protrusion and the second protrusion do not overlap with each other, or at least partially overlap with each other.

18. The force sensor of claim 17, wherein a spacing between the center of the first protrusion and the center of the second protrusion in the first direction is smaller than a sum of a width of the first protrusion and a width of the second protrusion.

19. The force sensor of claim 18, wherein each of the first protrusion and the second protrusion comprises a first side and a second side along the first direction, and
wherein the second side of the first protrusion does not overlap with the second protrusion in to second direction perpendicular to the first direction.

20. The force sensor of claim 19, wherein the second side of the first protrusion is spaced apart from the first side of the second protrusion in the first direction.

21. The force sensor of claim 18, wherein each of the first protrusion and the second protrusion comprises a first side and a second side along the first direction, and
wherein the second side of the first protrusion overlaps with the second protrusion in a second direction perpendicular to the first direction.

22. A force sensor, comprising:
a plurality of sensing cells;
a plurality of first electrodes extended in a first extending direction; and
a plurality of second electrodes extended in a second extending direction and intersecting with the first electrodes;
wherein at least one of the sensing cells includes a plurality of sub-sensing regions located at intersections between the first electrodes and the second electrodes,
wherein at least one of the sub-sensing regions comprises:
a first surface and a second surface facing each other in a thickness direction the force sensor,
a plurality of protrusions protruded from the first surface toward the second surface,
one of the first electrodes on the plurality of first protrusions, and a first force sensing layer on the one first electrode,
a plurality of second protrusions protruded from the second surface toward the first surface, and
one of the second electrodes on the plurality of second protrusions,
wherein an adjacent first protrusion and second protrusion form a pair of protrusions,
wherein the first protrusion and the second protrusion in the pair do not overlap with each other, or at least partially overlap with each other, and
wherein the plurality of sub-sensing regions comprise a first sub-sensing region for sensing a shear force in a first direction.

23. The force sensor of claim 22, wherein the plurality of sub-sensing regions comprise a second sub-sensing region for sensing a shear force in a second direction.

24. The force sensor of claim 22, wherein the plurality of sub-sensing regions further comprises:
a second sub-sensing region configured to sense a shear force in a second direction,
a third sub-sensing region configured to sense a shear force in a third direction, and
a fourth sub-sensing region configured to sense a shear force in a fourth direction, and
wherein the first, second, third and fourth directions are on a same plane.

25. The force sensor of claim 24, wherein the first, second, third and fourth directions comprise an upward direction, a downward direction, a leftward direction, and a rightward direction.

26. The force sensor of claim 25, wherein the at least one sensing cell further comprises a pressure sensing region for sensing a pressure in the thickness direction.

27. The force sensor of claim 24, wherein the second sub-sensing region is disposed adjacent to the first sub-sensing region in the first extending direction,
wherein the third sub-sensing region is disposed adjacent to the first sub-sensing region in the second extending direction, and
wherein the fourth sub-sensing region is disposed adjacent to the third sub-sensing region in the first extending direction.

28. The force sensor of claim 27, wherein the first sub-sensing region shares the same first electrode with the second sub-sensing region, and
wherein the third sub-sensing region shares the same first electrode with the fourth sub-sensing region.

29. The force sensor of claim 28, wherein the first sub-sensing region shares the same second electrode with the third sub-sensing region, and
wherein the second sub-sensing region shares the same second electrode with the fourth sub-sensing region.

30. A force sensor, comprising:
a first surface and a second surface facing each other in a first direction;
a first protrusion protruded from the first surface toward the second surface;
a first electrode on the first protrusion;
a first force sensing layer on the first electrode;
a second protrusion protruded from the second surface toward the first surface; and
a second electrode on the second protrusion,
wherein the first protrusion and the second protrusion are not overlapped with each other or are partially overlapped with each other,
wherein the first protrusion does not come in contact with the second electrode in the first direction when the force sensor is pressed in the first direction.

* * * * *